United States Patent
Eliyahu et al.

(10) Patent No.: US 10,093,843 B2
(45) Date of Patent: *Oct. 9, 2018

(54) ELASTOMER AND/OR COMPOSITE BASED MATERIAL FOR THERMAL ENERGY STORAGE

(71) Applicant: ENRAD LTD., Moshav Shahar (IL)

(72) Inventors: Nitzan Eliyahu, Moshav Shahar (IL); Mirco Pellegrini, Tione di Trento (IT)

(73) Assignee: ENRAD LTD., Shahar (IL)

( * ) Notice: Subject to any disclaimer, the term of this patent is extended or adjusted under 35 U.S.C. 154(b) by 42 days.

This patent is subject to a terminal disclaimer.

(21) Appl. No.: 15/029,258

(22) PCT Filed: Oct. 7, 2014

(86) PCT No.: PCT/IL2014/050888
§ 371 (c)(1),
(2) Date: Apr. 14, 2016

(87) PCT Pub. No.: WO2015/056260
PCT Pub. Date: Apr. 23, 2015

(65) Prior Publication Data
US 2016/0251558 A1    Sep. 1, 2016

Related U.S. Application Data

(60) Provisional application No. 61/890,902, filed on Oct. 15, 2013.

(51) Int. Cl.
| | |
|---|---|
| *C08L 9/06* | (2006.01) |
| *C09K 5/06* | (2006.01) |
| *C08L 71/00* | (2006.01) |
| *B29C 70/58* | (2006.01) |
| *C08L 23/16* | (2006.01) |
| *F28D 20/02* | (2006.01) |

(52) U.S. Cl.
CPC .............. *C09K 5/063* (2013.01); *B29C 70/58* (2013.01); *C08L 9/06* (2013.01); *C08L 23/16* (2013.01); *C08L 71/00* (2013.01); *F28D 20/023* (2013.01)

(58) Field of Classification Search
CPC .............. C09K 5/063; C08L 9/00; C08L 9/06
USPC ........................................................ 252/73
See application file for complete search history.

(56) References Cited

U.S. PATENT DOCUMENTS

| | | |
|---|---|---|
| 6,399,149 B1 | 6/2002 | Klett et al. |
| 6,433,865 B1 | 8/2002 | Kimura et al. |
| 7,316,262 B1 | 1/2008 | Rini et al. |
| 2005/0043485 A1 | 2/2005 | Lee et al. |
| 2012/0065314 A1* | 3/2012 | Lamkin ................ C08L 23/16 524/423 |
| 2013/0158172 A1 | 6/2013 | Lopez |
| 2015/0073085 A1 | 3/2015 | Eliyahu et al. |
| 2015/0079322 A1 | 3/2015 | Pellegrini et al. |

FOREIGN PATENT DOCUMENTS

| | | |
|---|---|---|
| EP | 0412021 A1 | 2/1991 |
| EP | 1502726 A1 | 2/2005 |
| FR | 2715719 A1 | 8/1995 |
| WO | WO 1998/004644 | 2/1998 |
| WO | WO 2013/156996 A1 | 10/2013 |
| WO | WO 2013/156997 A1 | 10/2013 |

OTHER PUBLICATIONS

Chou et al. "Organic-inorganic sol-gel coating for corrosion protection of stainless steel" Journal of Materials Science Letters. Feb. 1, 2002;21(3)251-5.
International Search Report for Pci Application No. PCT/IL2014/050888 dated Dec. 31, 2014.
Rabin et al. "Integrated solar collector storage system based on a salt-hydrate phase-change material" Solar Energy. Dec. 1, 1995;55(6):435-44.
Sharma et al. "Review on thermal energy storage with phase change materials and applications" Renewable and Sustainable energy reviews. Feb. 28, 2009;13(2):318-45.
Supplementary European Search Report for European Application No. 14854846.4 dated May 29, 2017.
Zalba et al. "Review on thermal energy storage with phase change: materials; heat transfer analysis and applications" Applied thermal engineering. Feb. 28, 2003:23(3):251-83.

* cited by examiner

*Primary Examiner* — Edward J Cain
(74) *Attorney, Agent, or Firm* — Mark Cohen; Pearl Cohen Zedek Latzer Baratz

(57) ABSTRACT

A composite material for storing thermal energy at various temperatures (30° C. to 450° C.) formed by an elastomer matrix into which a phase change material such as an inorganic salt is encapsulated. The material is characterized by a high volumetric thermal conductivity, a low density, a highly interconnected porosity and a relatively high modulus of elasticity. The significant properties of the matrices are: a large amount of energy involved in full melting/crystallization, a fairly low relative volume expansion upon melting and fairly low sub-cooling. The main advantages of the resulting composites are a very high energy density, a relatively low volume expansion, highly enhanced heat transfer, thermo adaptability, stability and insignificant hysteresis.

21 Claims, 10 Drawing Sheets

ELASTOMER AND/OR COMPOSITE BASED MATERIAL FOR THERMAL ENERGY STORAGE

CROSS-REFERENCE TO RELATED APPLICATIONS

This application is a National Phase Application of PCT International Application No. PCT/IL2014/050888, International Filing Date Oct. 7, 2014 which claims priority from U.S. Provisional Ser. No. 61/890,902 filed Oct. 15, 2013; which are hereby incorporated by reference in its entirety.

FIELD OF THE INVENTION

This invention relates to composite thermal energy storage materials and their precursors. Specifically, the invention relates to phase change materials encapsulated in materials such as elastomers, metal oxides, ceramics, and glasses, and methods for making them and their precursors. In particular, it relates to precursors to elastomer compositions that combine natural or synthetic rubber with thermoplastic vulcanizates, microparticles of thermoplastic vulcanizates, thermoplastics that comprise microparticles of rubber, or thermoplastics that comprise microparticles of recycled rubber, thermoplastic incorporating microparticles of thermoplastic (cured or uncured) or other phase change materials. And ceramics that combine ceramics precursors or glass precursors with phase change materials. And combination of them.

BACKGROUND OF THE INVENTION

Currently, there are many applications that require storing a large amount of heat. In the industrial sector, the recovery, storage and re-use of residual heat could play a significant role for an efficient, economical use of energy. In the generation of energy based on conventional conversion techniques (i.e. gas or oil power plants), the storage of heat could be a useful way to improve the efficacy and recovery thereof, as well as to reduce the nominal energy required to adjust to load peaks.

Significant network stability problems have arisen in electricity generation from renewable energy sources, due to the increase in the amount of electricity generated from these sources and the dependence of the electricity generation on the availability of the resource. For example, solar power plants stop operating at night. The integration of heat energy storage into the operation of such a power plant would help to prevent network stability problems and extend the energy supply period, as well as to increase the efficiency in co-generation, which would contribute to a satisfactory commercialization of these technologies. In the case of autonomous solar thermal plants in remote or isolated electric parks, energy storage is a key element for maximizing the capacity factor and ensuring availability and reducing the mismatch between supply and demand. Most current solar heating systems have storage for a few hours to a day's worth of energy collected, by using thermal energy storage materials (TESMs). Thermal energy storage (TES) helps overcome the intermittency of the solar resource for concentrating solar power (CSP) plants (Dincer and Dost, 1996, "A perspective on thermal energy storage systems for solar energy applications," International Journal of Energy Research, 20(6), pp. 547-557). TES systems contains a thermal storage mass, and can be based on latent, sensible and thermo-chemical energy storage (Sharma, et al., 2009, "Review on thermal energy storage with phase change materials and applications," Renewable and Sustainable Energy Reviews, 13(2), pp. 318-345; Gil, et al., 2010, "State of the art on high temperature thermal energy storage for power generation. Part 1 Concepts, materials and modellization", Renewable and Sustainable Energy Reviews, 14(1), pp. 31-55).

Another example of an application in which thermal energy storage is critical is thermal protection for high energy electronic devices.

Despite the interest, there are very few commercially available high-capacity thermal energy storage systems, due to the high investment cost of existing technologies. In storage systems, an essential aspect to achieve significant cost reduction is the development of low-cost materials that meet the energy requirements for storage in power generation plants, have long-term stability, and a sufficient capacity to prevent over dimensioning of the storage unit.

Existing thermal energy storage technologies are typically based on sensible heat storage systems using liquids (i.e. oils, molten salts) or solids (i.e. metals, ceramics, stones, concrete) as a means of storage. Liquids predominate in applications in the temperature range of 150-400° C., while solids predominate in the temperature interval beyond 500-600° C. For these solids, the energy densities range between 1500-3000 kJ/(m$^3$·K) and the investment costs range from 30 g/kWh for concrete to 400 g/kWh for ceramic materials.

Heat storage based on phase-change materials (latent heat technology) shows a high potential for the development of efficient, economical storage systems, especially for applications that use fluids that undergo a constant temperature process, such as wet steam during condensation or evaporation. The main advantage of phase change materials is their capacity to store/release a large amount of heat in a narrow temperature interval during phase changes.

Salts have been identified as potential candidates for the development of efficient, economical latent heat storage systems. The latent energy or heat involved in the melting/crystallization of salts is normally within the interval between 100-1000 kJ/kg (0.2-2 GJ/m$^3$); these values generally increase with the melting temperature of the salts.

Phase-change heat storage technology using salts utilizes significantly decreased system volumes in comparison to sensible heat technologies, typically by a factor of more than ten, which prevents over dimensioning of the heat exchanger. The low thermal conductivities of salts (<1 W/m/K) are a limiting factor in meeting the energy requirements of the intended industrial applications, however.

Different methods for increasing Thermal conductivity of phase-change materials have been proposed and tested, primarily involving the use of paraffin waxes. The earliest proposed solutions were the use of metal charges, such as aluminum or copper additives, metal foams, or fins. It was found that when these additives were used, the charging and discharging times of the storage system significantly decreased. This solution is of questionable commercial viability because the metal charges add significant weight and cost to the storage systems, and in addition increase the risk of corrosion.

Due to their low density, paraffin waxes supported within a porous structure of an activated silica or carbon catalyst have been proposed as alternatives to the use of metal charges.

Another proposed alternative comprises conductivity enhancement techniques based on graphite additives and graphite foams saturated with or in phase-change materials (PCMs), International (PCT) Pat. Appl. WO98/04644, French Pat. Appl. No. 2715719, and U.S. Pat. Nos. 7,316,262 and 6,399,149 all disclose porous structures (metal or carbon foams, carbon fibers) filled with phase-change materials (PCMs) that melt at low temperatures.

Heat energy storage systems for high temperatures have only been developed relatively recently and are primarily based on the use of salts the conductivity of which is enhanced using graphite. Graphite is used primarily because of its high resistance to corrosion and chemical attack, it's very high thermal conductivity, and its low cost.

Although the efficacy of carbon in enhancing the conductivity of salts has been proven, various problems and limitations have been identified for carbon/salt composites to become a real option for storing heat energy.

The main disadvantage is generally related to the volume expansion of salts when they melt and are subsequently subjected to mechanical stress. Thus, improvements in carbon-salt materials will depend on finding salts with a fairly low relative volume expansion as well as carbon structures that allow for the local management of the volume expansion of salts.

The salts that have already been developed for this use are those that undergo melt at constant temperature (pure salts, eutectic mixtures). Consequently, the use thereof is limited to applications with operational fluids that also undergo a constant temperature process, such as wet steam during condensation or evaporation. If they are to be used in applications that require several temperatures, cascades of appropriate salts must be implemented in order to meet the process requirements in terms of the inlet/outlet temperatures of the operational fluid. While such a cascade could be viable, it would come at the expense of the simplicity of the storage system. In this regard, mixtures of salts that undergo melting in an appropriate temperature interval could be a practical alternative, since there would be no segregation of the chemical components of the salt.

The energy density (latent heat) of the salts known in the art ranges between 100 and 360 kJ/kg. Development of a salt that provides a significantly higher energy density might be a way to increase the compactness of the storage systems and, consequently, reduce investment costs.

Most inorganic phase-change materials present sub-cooling. This is a natural random phenomenon that can lead to significant differences between the melting and crystallization temperatures. In heat energy storage applications, sub-cooling is generally a disadvantage, because it entails using different operating temperatures for charging and discharging.

Compared to the use of salts in latent heat storage, the use of phase change materials (PCMs) is very attractive because of their high storage capacity; their charging and discharging heat at a nearly constant temperature; their minimal maintenance requirements; the ability to produce them at a range of temperatures; and the ease of their integration into existing a power plants. See, for example, Abhat, "Performance studies of a finned heat pipe latent thermal energy storage system," Proc. Mankind's future source of energy; Proceedings of the International Solar Energy Congress, Pergamon Press, Inc., New Delhi, India, pp. 541-546; Zalba, et al., 2003, "Review on thermal energy storage with phase change: materials, heat transfer analysis and applications," Applied Thermal Engineering, 23(3), pp. 251-283; Al-Jandal and Sayigh, 1994, "Thermal performance characteristics of STC system with Phase Change Storage," Renewable Energy, 5(1-4), pp. 390-399; Baran and Sari, 2003, "Phase change and heat transfer characteristics of a eutectic mixture of palmitic and stearic acids as PCM in a latent heat storage system," Energy Conversion and Management, 44(20), pp. 3227-3246; Fouda, et al., 1984, "Solar storage systems using salt hydrate latent heat and direct contact heat exchange. I. Characteristics of pilot system operating with sodium sulphate solution," Solar Energy, 32(1), pp. 57-65; Morrison and Abdel-Khalik, 1978, "Effects of phase-change energy storage on the performance of air-based and liquid-based solar heating systems," Solar Energy, 20(1), pp. 57-67; Rabin, et al., 1995, "Integrated solar collector storage system based on a salt-hydrate phase-change material," Solar Energy, 55(6), pp. 435-444; Velraj, et al., 1999, "Heat Transfer Enhancement in a Latent Heat Storage System," Solar Energy, 65(3), pp. 171-180; Medrano, et al., 2010, "State of the art on high-temperature thermal energy storage for power generation. Part 2—Case studies," Renewable and Sustainable Energy Reviews, 14(1), pp. 56-72; Jotshi, et al., 1992, "Solar thermal energy storage in phase change materials," SOLAR '92: American Solar Energy Society (ASES) Annual Conference Cocoa Beach, Fla., pp. 174-179); all of which are hereby incorporated by reference.

PCMs can store heat using solid-solid, solid-liquid, solid-gas and liquid-gas phase change, though only solid-liquid change is used in PCMs for electrical generation and thermal energy storage. Solid-liquid PCMs increase in temperature as they absorb heat, until PCM reaches the phase change temperature (melting temperature). At the phase change, the PCM absorbs large amounts of heat with minimal temperature change, until the material has undergone a phase transition. When the ambient temperature around a liquid material falls, the PCM solidifies, releasing its considerable amount of latent energy. PCMs are widely used in the art because of the high energy storage density associated with the change of phase.

In a latent heat energy storage system, selection of the appropriate PCM is very important. Most systems known in the art use salt hydrates, paraffins, inorganic acids, clathrates, and eutectic mixtures of organic and/or inorganic compounds. A list of common PCMs for various applications has been compiled by Lange (Lane, 1986, Solar Heat Storage: Latent Heat Materials, CRC Press, Inc, Boca Raton, Fla., which is hereby incorporated by reference). In comparison to organic compounds, inorganic compounds in general have the advantages of having higher latent heat per unit volume, being nonflammable, and having lower costs in comparison to organic compounds (see Tyagi, et al., 2011, "Development of phase change materials based microencapsulated technology for buildings: A review," Renewable and Sustainable Energy Reviews, 15(2), pp. 1373-1391; Agyenim, et al., 2010, "A review of materials, heat transfer and phase change problem formulation for latent heat thermal energy storage systems (LHTESS)," Renewable and Sustainable Energy Reviews, 14(2), pp. 615-628, both of which are hereby incorporated by reference).

There are some problems associated with salt-based PCMs, however. Inorganic PCMs generally have low thermal conductivity (0.1-0.6 W/m$^3$ K), leading to low heat transfer rates and oxidation on exposure to the heat transport medium (air or heat transfer fluids like oils). In order to overcome such problems, heat transfer enhancement techniques, such as use of extended surfaces and dispersion of high conductivity materials, have been identified and applied (see Jegadheeswaran and Pohekar, 2009, "Performance enhancement in latent heat thermal storage system: A review," Renewable and Sustainable Energy Reviews, 13(9), pp. 2225-2244, which is hereby incorporated by reference). Another technique to overcome the low heat transfer rate is to encapsulate the PCM within a secondary supporting structure, and use of these capsules in a packed/fluidized bed heat exchanger (see Hawlader, and Zhu, 2000, "Preparation and Evaluation of a Novel Solar Storage Material: Microencapsulated Paraffin," International Journal of Solar Energy, 20(4), pp. 227-238, which is hereby incorporated by reference). These materials are also encapsulated to prevent water evaporation or uptake, but since they have very low heat transfer characteristics, they tend to solidify at the edges of the encapsulating container, preventing effective heat transfer.

Since the progress of latent heat storage systems mainly depends on ensuring a high effective heat transfer rate to allow rapid charging and discharging, the required heat transfer surfaces should be large to maintain a low temperature gradient during these processes. This requirement can be met efficiently through macroencapsulation.

Macroencapsulated PCMs refer to PCMs incorporated into capsules larger than 1 mm (see Li, et al., 2012, "Fabrication and morphological characterization of microencapsulated phase change materials (MicroPCMs) and macrocapsules containing MicroPCMs for thermal energy storage," Energy, 38(1), pp. 249-254, which is hereby incorporated by reference). PCM macrocapsules are generally made by preformed shells such as tubes, pouches, spheres, panels or other receptacles with the PCM and sealing the preformed shell (see Cabeza, et al., 2011, "Materials used as PCM in thermal energy storage in buildings: A review," Renewable and Sustainable Energy Reviews, 15(3), pp. 1675-1695, which is hereby incorporated by reference). The most cost-effective containers are plastic bottles (high density and low density polyethylene and polypropylene bottles for low temperature storage), tin-plated metal cans, and mild steel cans (see Regin, et al., 2008, "Heat transfer characteristics of thermal energy storage system using PCM capsules: A review," Renewable and Sustainable Energy Reviews, 12(9), pp. 2438-2458; Bauer, et al., 2012, "Characterization of Sodium Nitrate as Phase Change Material," International Journal of Thermophysics, 33(1), pp. 91-104; Farid, et al., 2004, "A review on phase change energy storage: materials and applications," Energy Conversion and Management, 45(9-10), pp. 1597-1615; Chou, T. P., Chandrasekaran, C, Limmer, S., Nguyen, C, and Cao, G. Z., 2002, "Organic-inorganic sol-gel coating for corrosion protection of stainless steel," Journal of Materials Science Letters, 21 (3), pp. 251-255, all of which are hereby incorporated by reference).

The encapsulation process tends to be expensive and difficult, however. Therefore, there remains a need for a thermal energy storage material composition that permits effective heat transfer without requiring encapsulation.

Polymers are low-cost materials that have many mechanical properties that might make them appropriate for use as thermal energy storage materials. Vulcanization (the use of sulfur to cross-link polymer chains) of rubber was discovered more than a century and a half ago. Since then, cross-linked polymer compositions based on natural or synthetic rubber have found uses ranging from automotive to medical to printing. Nonetheless, the properties of rubber are not always ideal for the applications to which they are put. For example, to obtain good mechanical characteristics, the compound must be mixed with so called "reinforcing fillers" such as carbon black or silica. Without the reinforcing fillers, the mechanical characteristics of the rubber compound are too weak.

In many cases, despite the drawbacks of rubber, other polymers are also inappropriate for use in a particular application. For example, while thermoplastic polymers require little or no compounding, they lack elastic properties, and in general it is not possible to modify significantly their characteristics by changes in formulation, thus limiting the types of applications for which they are suitable.

Thus, there remains a long-felt need for a formulation that can be used to produce an elastomer for use as a thermal energy storage material that combines the advantageous properties of rubber (low cost, high chemical and heat resistance, ability to be loaded with filler) with the advantageous properties of other polymers such as thermoplastic polymers.

SUMMARY OF THE INVENTION

The present invention is designed to meet this long-felt need. In particular, thermal energy storage materials are disclosed, the thermal energy storage materials being based on improved elastomeric materials. The elastomeric material from which the thermal energy storage materials of the present invention are made is itself made from a precursor comprising a mixture of natural and/or synthetic rubber and a thermoplastic vulcanizate (TPV) along with a cross-linking agent. Methods for making these precursors are also disclosed.

It is therefore an object of the present invention to disclose composite material for storing thermal energy, wherein said composite material comprises a matrix comprising an elastomeric material, said elastomeric material made from a precursor comprising: rubber; a material incorporated into said rubber, said material selected from the group consisting of thermoplastic vulcanizate (TPV), microparticles of TPV, thermoplastic incorporating microparticles of rubber, thermoplastic incorporating microparticles of cured thermoplastic, thermoplastic incorporating microparticles of uncured thermoplastic, and any combination thereof, and, at least one cross-linking agent.

It is a further object of the invention to disclose such a composite material, further comprising at least one type of microparticulate phase change material (PCM) dispersed within said elastomeric material.

In some embodiments of the invention, the matrix comprises a rubber-TPV/thermoplastic composite into which rubber microparticles have been incorporated. In other embodiments of the invention, the matrix comprises a rubber-TPV/thermoplastic composite into which rubber-ceramic microparticles have been incorporated. In yet other embodiments of the invention, the matrix comprises a rubber-thermoplastic composite into which rubber microparticles have been incorporated. In yet other embodiments of the invention, the matrix comprises a rubber-thermoplastic composite into which rubber-ceramic microparticles have been incorporated. In yet other embodiments of the invention, the matrix comprises a rubber-thermoplastic composite into which microparticles of cured thermoplastic have been incorporated. In yet other embodiments of the invention, the matrix comprises a rubber-thermoplastic composite into which microparticles of cured thermoplastic-ceramic have been incorporated.

It is a further object of the invention to disclose a composite material for storing thermal energy as defined in any of the above, wherein said matrix has a three-dimensional structure that allows free passage of gases and/or liquids.

It is a further object of the invention to disclose a composite material for storing thermal energy as defined in any of the above, wherein said matrix is in a form selected from the group consisting of honeycomb, foam, and block with interior tunnels.

It is a further object of the invention to disclose a composite material for storing thermal energy as defined in any of the above, wherein said microparticulate PCM comprises an encapsulated inorganic salt.

In some preferred embodiments of the invention, said inorganic salt is selected from the group consisting of aluminum bromide, aluminum hydroxide, aluminum nitrate, ammonium formate, ammonium nitrate, calcium citrate, calcium chloride hexahydrate, calcium nitrate, calcium phosphate, calcium saccharate, chromic chloride hexahydrate, lithium hydroxide, magnesium acetate, manganese chloride dihydrate, manganese nitrate, potassium acetate, potassium bisulfate, potassium formate, potassium hydroxide, potassium nitrite, potassium phosphate, sodium acetate, sodium bisulfate, sodium borate, sodium formate, sodium citrate, sodium hydroxide, sodium nitrate, sodium persulfate, sodium phosphate, sodium propionate, sodium tetraborate, sodium thiosulfate, strontium hydrophosphate, zinc acetate, zinc chloride, a eutectic of $Li_2CO_3$ and $Na_2CO_3$, and any combination thereof.

It is a further object of the invention to disclose the composite material for storing thermal energy as defined in any of the above, wherein said microparticulate PCM comprises an organic compound. In some embodiments of the invention, said organic compound is selected from the group consisting of n-tetradecane, n-pentadecane, n-hexadecane, n-heptadecane, n-octadecane, n-eicosane, n-triacontane, n-tetracontane, n-pentacontane, polyethylene wax, paraffin wax, caprylic acid, capric acid, lauric acid, myristic acid, palmitic acid, xylitol, D-sorbitol, erythritol, D-mannitol, galactitol, triethylene glycol, PEG-400, PEG-600, PEG-1000, PEG-3000, PEG-6000, PEG-10000, glycerin, D-lactic acid, methyl palmitate, camphenilone, docasyl bromide, caprylone, phenol, heptadecanone, 1-cyclohexylooctadecane, 4-heptadacanone, p-toluidine, cyanamide, methyl eicosanate, 3-heptadecanone. 2-heptadecanone, hydrocinnamic acid, cetyl alcohol, 1-napthylamine, camphene, o-nitroaniline, 9-heptadecanone, thymol, methyl behenate, diphenylamine, p-dichlorobenzene, oxolate, hypophosphoric acid, o-xylylene dichloride, chloroacetic acid, nitronaphthalene, trimyristin, heptaundecanoic acid, beeswax, glycolic acid, azobenzene, acrylic acid, phenylacetic acid, thiosinamine, bromocamphor, durene, benzylamine, methyl bromobenzoate, 1-napthol, glutaric acid, p-xylylene dichloride, catechol, quinone, acetanilide, succinic anhydride, benzoic acid, stibene, benzamide, elaidic acid, pentadecanoic acid, tristearin, stearic acid, acetamide, methyl fumarate and any combination thereof.

It is a further object of the invention to disclose a composite material for storing thermal energy as defined in any of the above, wherein said microparticulate PCM comprises microparticles encapsulated in microcapsules. In some embodiments of the invention, said microcapsules comprise (a) microparticles of a material selected from the group consisting of inorganic salts and organic compounds, and (b) a sol-gel coating disposed on an external surface of said microparticles. In some embodiments of the invention, said microcapsules comprise microparticles of a material selected from the group consisting of inorganic salts and organic compounds encapsulated within a material selected from the group consisting of metal oxides, aluminum nitride, boron nitride, graphene, natural expanded graphite, and graphene-metal oxide composites. In some embodiments of the invention in which the microparticles are encapsulated by a metal oxide, said metal oxide is selected from the group consisting of silicon dioxide, titanium dioxide, zinc oxide, calcium oxide, barium oxide, titanium dioxide-silicon dioxide composite, cerium dioxide, iron (III) trioxide, aluminum (III) oxide, magnesium oxide, lithium cobalt dioxide, lithium nickel dioxide, zinc oxide, zirconium dioxide, lithium oxide, titanium oxide, lithium aluminum manganese oxide, lithium nickel manganese oxide, lithium dimanganese tetroxide, indium tin oxide, and combinations thereof. In some embodiments of the invention, an external surface of said microcapsules is functionalized. In some preferred embodiments of the invention, said external surface is silane functionalized. In some preferred embodiments of the invention, said microcapsules comprise a void space.

It is a further object of the invention to disclose a composite material for storing thermal energy as defined in any of the above, wherein said microparticles of rubber comprise microparticles of recycled rubber.

It is a further object of the invention to disclose a composite material for storing thermal energy as defined in any of the above, wherein said rubber is selected from the group consisting of natural rubber (NR), nitrile butadiene rubber (NBR), hydrogenated nitrile butadiene rubber (HNBR), carboxylated nitrile rubber (XNBR), butyl rubber (IIR), chlorobutyl rubber (CIIR), bromobutyl rubber (BIIR), polychloroprene (CR), styrene-butadiene rubber (SBR), polybutadiene (BR), ethylene-propylene-diene tripolymer (EPDM), ethylene-propylene rubber (EPM), polyurethane rubber (PU), acrylic rubber (ACM), ethylene vinylacetate copolymer rubber (EVM), silicone rubber, and any combination of the above.

It is a further object of the invention to disclose a composite material for storing thermal energy as defined in any of the above, wherein said TPV is selected from the group consisting of TPVs and TPV precursors of the following types of rubber: polypropylene/EPDM (ppEPDM), thermoplastc-silicone mixtures, styrene-based thermoplastic vulcanizates, poly(styrene-butadiene-styrene) (SBS), styrene isoprene butadiene (SIBS), acrylonitrile butadiene styrene (ABS), and styrene ethylene butylene styrene copolymer (SEBS), polyethylene/EPDM (peEPDM), polyethylene/EPM (peEPM), polyurethane (PU), polyamide/acrylic rubber (paACM), polyoxymethylene/nitrile rubber (pom-NBR), and thermoplastic polyester elastomer/ethylene-vinylacetate copolymer rubber (tpc-etEVM), and any combination thereof. In some embodiments of the invention, said TPV is ppEPDM.

It is a further object of the invention to disclose a composite material for storing thermal energy as defined in any of the above, wherein said rubber is EPDM and said TPV is ppEPDM.

It is a further object of the invention to disclose a composite material for storing thermal energy as defined in any of the above, wherein said cross-linking agent is selected from the group consisting of sulfur, sulfur donor, peroxides, phenolic resins, amines, and acrylates. In some embodiments of the invention, said cross-linking agent is a peroxide selected from the group consisting of butyl-4,4-di(tert-butylperoxy)valerate; di(tert-butyl) peroxide; di(tert-butylperoxyisopropyl)benzene; dicumyl peroxide; and 2,5-dimethyl-2,5-bis-(tert-butylperoxy)hexane.

It is a further object of the invention to disclose a composite material for storing thermal energy as defined in any of the above, wherein the weight ratio of said rubber to material selected from the group consisting of thermoplastic vulcanizate (TPV), thermoplastic incorporating microparticles of rubber, thermoplastic incorporating microparticles of thermoplastic, and any combination thereof is between 90:10 and 10:90. In some preferred embodiments of the invention, the weight ratio of said rubber to material selected from the group consisting of thermoplastic vulcanizate (TPV), thermoplastic incorporating microparticles of rubber, thermoplastic incorporating microparticles of thermoplastic, and any combination thereof is between 70:30 and 30:70.

It is a further object of the invention to disclose a composite material for storing thermal energy as defined in any of the above, wherein said precursor additionally comprises a cross-linking co-agent. In some embodiments of the invention, said cross-linking co-agent is selected from the group consisting of acrylates, triazines, and 1,8-diazabicyclo-5,4,0-undec-7-ene (DBU) with saturated dibasic acids. In some embodiments of the invention, wherein said cross-linking co-agent is trimethyl-ol-propane-trimethylacrylate (TMPTMA).

It is a further object of the invention to disclose a composite material for storing thermal energy as defined in any of the above, wherein said precursor additionally comprises at least one filler. In some embodiments of the invention, said filler comprises a substance selected from the group consisting of natural expanded graphite, graphite, carbon black, silica, mica, kaolin, clay, coal dust, lignin, talc, $BaSO_4$, $CaCO_3$, $Al(OH)_3$, $Mg(OH)_2$, ZnO, and MgO. In some embodiments of the invention, said precursor comprises between 1% and 70% by weight filler.

It is a further object of the invention to disclose a composite material for storing thermal energy as defined in any of the above, wherein said precursor additionally comprises a material selected from the group consisting of aluminum nitride, boron nitride, carbon black, graphite, graphene, natural expanded graphite, and graphene-metal oxide composites. In some embodiments of the invention, said precursor comprises between 1% and 60% by weight carbon black. In some embodiments of the invention, said precursor comprises between 5% and 35% by weight carbon black.

It is a further object of the invention to disclose a composite material for storing thermal energy as defined in any of the above, wherein said precursor additionally comprises plasticizer.

It is a further object of the invention to disclose a composite material for storing thermal energy as defined in any of the above, wherein said precursor additionally comprises at least one material selected from the group consisting of anti-ozonants, anti-aging materials, and anti-degradants.

It is a further object of the invention to disclose a composite material for storing thermal energy as defined in any of the above, wherein said phase change material has a working temperature of between 30° C. and 450° C. In preferred embodiments of the invention, said phase change material has a working temperature of between 60° C. and 260° C.

It is a further object of the invention to disclose a cell 100 for a thermal energy storage system, wherein said cell comprises at least one heat exchange unit 101 in thermal contact with said cell; and composite material 102 comprising composite material as defined in any of the above located within said cell and in thermal contact with said heat exchange unit; and a heat conductive rubber matrix 103 located within said cell.

It is a further object of the invention to disclose a method for making a composite material for thermal energy storage, wherein said method comprises: preparing a matrix comprising an elastomeric material, said preparing comprising mixing rubber and at least one material selected from the group consisting of TPV, thermoplastic incorporating microparticles of rubber and any combination thereof and adding at least one cross-linking agent; and, dispersing encapsulated microparticles of a phase change material (PCM) within said matrix. In some embodiments of the invention, said step of dispersing comprises homogeneously dispersing.

It is an object of the present invention to disclose the method disclosed above, additionally comprising: forming pellets from microparticles; coating said microparticles with a polyimide polymer, thereby forming polyimide-coated microparticles; obtaining a silicon dioxide sol-gel precursor; mixing said silicon dioxide sol-gel precursor with 3-aminopropytriethoxysilane, thereby forming a silicate precursor; placing said polyimide-coated microparticles in said silicate precursor; heating said silicate precursor; adding ethanol and hydrochloric acid to said silicate precursor; hydrolyzing said silicate precursor; neutralizing said silicate precursor; and, encapsulating said polyimide-coated microparticles with said sol-gel silicon dioxide precursor. In some embodiments of the invention, said silicon dioxide precursor is selected from the group consisting of tetraethyl orthosilicate and tetraethyl orthosilicate containing graphene. In some embodiments of the invention, said step of hydrolyzing is performed for between 5 and 10 minutes.

In some preferred embodiments of the invention, said step of forming pellets from microparticles comprises forming pellets from a microparticulate PCM.

In some embodiments of the invention, said step of forming pellets from microparticles comprises forming pellets from a microparticulate PCM comprising at least one inorganic salt. In some particularly preferred embodiments of the invention, said inorganic salt is selected from the group consisting of aluminum bromide, aluminum hydroxide, aluminum nitrate, ammonium formate, ammonium nitrate, calcium citrate, calcium chloride hexahydrate, calcium nitrate, calcium phosphate, calcium saccharate, chromic chloride hexahydrate, lithium hydroxide, magnesium acetate, manganese chloride dihydrate, manganese nitrate, potassium acetate, potassium bisulfate, potassium formate, potassium hydroxide, potassium nitrite, potassium phosphate, sodium acetate, sodium bisulfate, sodium borate, sodium formate, sodium citrate, sodium hydroxide, sodium nitrate, sodium persulfate, sodium phosphate, sodium propionate, sodium tetraborate, sodium thiosulfate, strontium hydrophosphate, zinc acetate, zinc chloride, a eutectic of $Li_2CO_3$ and $Na_2CO_3$, and any combination thereof.

In some embodiments of the invention, said step of forming pellets from microparticles comprises forming pellets from a microparticulate PCM comprising at least one organic compound. In some particularly preferred embodiments of the invention, said organic compound is selected from the group consisting of n-tetradecane, n-pentadecane, n-hexadecane, n-heptadecane, n-octadecane, n-eicosane, n-triacontane, n-tetracontane, n-pentacontane, polyethylene wax, paraffin wax, caprylic acid, capric acid, lauric acid, myristic acid, palmitic acid, xylitol, D-sorbitol, erythritol, D-mannitol, galactitol, triethylene glycol, PEG-400, PEG-600, PEG-1000, PEG-3000, PEG-6000, PEG-10000, glycerin, D-lactic acid, methyl palmitate, camphenilone, docasyl bromide, caprylone, phenol, heptadecanone, 1-cyclohexylooctadecane, 4-heptadacanone, p-toluidine, cyanamide, methyl eicosanate, 3-heptadecanone. 2-heptadecanone, hydrocinnamic acid, cetyl alcohol, 1-napthylamine, camphene, o-nitroaniline, 9-heptadecanone, thymol, methyl behenate, diphenylamine, p-dichlorobenzene, oxolate, hypophosphoric acid, o-xylene dichloride, chloroacetic acid, nitronaphthalene, trimyristin, heptaundecanoic acid, beeswax, glycolic acid, azobenzene, acrylic acid, phenylacetic acid, thiosinamine, bromocamphor, durene, benzylamine, methyl bromobenzoate, 1-napthol, glutaric acid, p-xylylene dichloride, catechol, quinone, acetanilide, succinic anhydride, benzoic acid, stibene, benzamide, elaidic acid, pentadecanoic acid, tristearin, stearic acid, acetamide, methyl fumarate and any combination thereof.

In some embodiments of the invention, said rubber is selected from the group consisting of natural rubber (NR), nitrile butadiene rubber (NBR), hydrogenated nitrile butadiene rubber (HNBR), carboxylated nitrile rubber (XNBR), butyl rubber (IIR), chlorobutyl rubber (CIIR), bromobutyl rubber (BIIR), polychloroprene (CR), styrene-butadiene rubber (SBR), polybutadiene (BR), ethylene-propylene-diene tripolymer (EPDM), silicone rubber, ethylene-propylene rubber (EPM), polyurethane rubber (PU), acrylic rubber (ACM), ethylene vinylacetate copolymer rubber (EVM) and any combination of the above, and said TPV is selected from the group consisting of TPVs and TPV precursors of the following types of rubber: ppEPDM, thermoplastic-silicone mixtures, styrene-based thermoplastic vulcanizates, SBS, SEBS, SIBS, ABS, PU, peEPDM, peEPM, paACM, pom-NBR, and tpc-etEVM.

In some embodiments of the invention, said step of mixing takes place within at least one apparatus selected from the group consisting of mixers, extruders, and mills. In some embodiments of the invention, said step of mixing comprises mixing at an operating temperature above the melting point of said TPV. In some embodiments of the invention, said step of mixing comprises mixing at an operating temperature of between 150 and 270° C. In some embodiments of the invention, said step of mixing comprises mixing until a constant stress is observed.

In some embodiments of the invention, said step of mixing comprises a step of mixing rubber and material selected from the group consisting of TPV, thermoplastic incorporating microparticles of rubber, thermoplastic incorporating microparticles of thermoplastic, and any combination thereof in a weight ratio (rubber:other substances) of between 90:10 and 10:90. In some preferred embodiments of the invention, said step of mixing comprises a step of mixing rubber and material selected from the group consisting of TPV, thermoplastic incorporating microparticles of rubber, and any combination thereof in a weight ratio (rubber:other substances) of between 70:30 and 30:70.

It is a further object of the invention to disclose a method as defined in any of the above, wherein said step of adding at least one cross-linking agent comprises adding at least one cross-linking agent selected from the group consisting of sulfur, sulfur donor, peroxides, and amines. In some embodiments of the invention, said step of adding at least one cross-linking agent comprises adding at least one peroxide selected from the group consisting of butyl-4,4-di(tert-butylperoxy)valerate; di(tert-butyl) peroxide; di(tert-butylperoxyisopropyl)benzene; dicumyl peroxide; and 2,5-dimethyl-2,5-bis-(tert-butylperoxy)hexane.

It is a further object of the invention to disclose a method as defined in any of the above, wherein said step of mixing takes place in an internal mixer, and additionally comprising a step of recompounding on a two-roll mill, said step of adding cross-linker taking place at least partially during the performance of said step of recompounding.

It is a further object of the invention to disclose a method as defined in any of the above, additionally comprising a step of adding carbon black. In some embodiments of the invention, said step of adding carbon black comprises adding between 1% and 60% by weight carbon black. In other embodiments of the invention, said step of adding carbon black comprises adding between 5% and 35% by weight carbon black.

It is a further object of the invention to disclose a method as defined in any of the above, wherein said step of mixing comprises mixing said rubber and said material selected from the group consisting of TPV, thermoplastic incorporating microparticles of rubber, and any combination thereof within an internal mixer, said step of adding carbon black comprises adding carbon black to said internal mixer, and said step of adding at least one cross-linking agent comprises adding cross-linking agent to the mixture after it has been removed from said mixer.

It is a further object of the invention to disclose a method as defined in any of the above, additionally comprising a step of adding a cross-linking co-agent during or after said step of mixing. It is a further object of the invention to disclose a method as defined in any of the above, wherein said step of adding a cross-linking co-agent comprises adding TMPTMA.

In some embodiments of the invention, said step of mixing comprises mixing said rubber and said material selected from the group consisting of TPV, thermoplastic incorporating microparticles of rubber, and any combination thereof within an internal mixer, said step of adding at least one cross-linking agent comprises adding cross-linking agent to the mixture after it has been removed from said mixer, and said step of adding at least one cross-linking co-agent comprises adding cross-linking agent to the mixture during mixing or after it has been removed from said mixer.

It is a further object of the invention to disclose a method as defined in any of the above, additionally comprising a step of compounding said rubber and said TPV on a mill, said step of compounding taking place after said step of mixing. In some embodiments of the invention, said step of compounding takes place prior to said step of adding at least one cross-linking agent. In some embodiments of the invention, said step of adding at least one cross-linking agent takes place at least partially while said step of compounding is taking place.

It is a further object of the invention to disclose a method as defined in any of the above, additionally comprising a step of depositing the mixture produced in said step of mixing onto a fabric base while feeding through a calender, thereby producing a continuous roll of material.

It is a further object of the invention to disclose a method as defined in any of the above, additionally comprising a step of depositing the mixture produced in said step of mixing into an extruder.

It is a further object of the invention to disclose a method as defined in any of the above, additionally comprising a step of extruding the mixture produced in said step of mixing, thereby producing a continuous extruded profile material.

It is a further object of the invention to disclose a method as defined in any of the above, additionally comprising a step of depositing the mixture produced in said step of mixing into a compression molding apparatus.

It is a further object of the invention to disclose a method as defined in any of the above, additionally comprising a step of compression molding the mixture produced in said step of mixing, thereby producing a molded product.

It is a further object of the invention to disclose a method as defined in any of the above, additionally comprising a step of injection molding the mixture produced in said step of mixing, thereby producing a molded product.

It is a further object of the invention to disclose a method as defined in any of the above, additionally comprising a step of depositing the mixture produced in said step of mixing into an injection molding apparatus.

It is a further object of the invention to disclose a method as defined in any of the above, additionally comprising dissolving the mixture produced in said step of mixing in a solvent; and producing a continuous roll of material by a method chosen from the group consisting of: dipping a fabric into the solution produced in said step of dissolving; and, spread-coating a fabric with the solution produced in said step of dissolving.

It is a further object of the invention to disclose a method as defined in any of the above, additionally comprising a step of feeding material produced in said step of adding a cross-linking agent into an apparatus selected from the group consisting of autoclaves, ovens and rotocures, and further wherein said step of activating said cross-linking agent occurs at least partially within said apparatus.

It is a further object of the invention to disclose a method as defined in any of the above, additionally comprising a step of feeding material produced in said step of adding a cross-linking agent into an apparatus selected from the group consisting of hot press, extruder, compression molding apparatus, and injection molding apparatus, and further wherein said step of activating said cross-linking agent occurs at least partially within said apparatus.

It is a further object of the invention to disclose a method as defined in any of the above, additionally comprising a step of adding filler. In some embodiments of the invention, said step of adding inorganic filler comprises a step of adding a filler comprising at least one substance selected from the group consisting of natural expanded graphite, graphite, carbon black, silica, mica, kaolin, clay, coal dust, lignin, talc, $BaSO_4$, $CaCO_3$, $Al(OH)_3$, $Mg(OH)_2$, ZnO, and MgO, said step of adding inorganic filler taking place prior to or substantially concurrent with said step of adding at least one cross-linking agent.

It is a further object of the invention to disclose a method as defined in any of the above, wherein said step of mixing comprises mixing at an operating temperature above the melting point of said TPV or thermoplastic polymer.

It is a further object of the invention to disclose a method as defined in any of the above, wherein said step of mixing comprises mixing at an operating temperature of between 90 and 300° C.

It is a further object of the invention to disclose a method as defined in any of the above, wherein said step of mixing said mixture comprises a step of mixing said mixture until a constant stress is observed.

It is a further object of the invention to disclose a method as defined in any of the above, additionally comprising a step of adding plasticizer.

It is a further object of the invention to disclose a method as defined in any of the above, additionally comprising a step of feeding said mixture into a mill following said step of mixing. In some embodiments of the invention, said step of adding a cross-linking agent occurs subsequent to said step of feeding said mixture into a mill.

It is a further object of the invention to disclose a method as defined in any of the above, wherein said step of mixing comprises mixing all components of said compound precursor except for said cross-linking agent within an apparatus selected from the group consisting of extruders and mixers.

It is a further object of the invention to disclose a method as defined in any of the above, comprising steps of making a precursor to an elastomeric material by the method as defined in any of the above, and activating said cross-linking agent.

It is a further object of the invention to disclose a method as defined in any of the above, wherein said step of mixing comprises mixing 60 parts by weight of EPDM with 40 parts by weight of ppEPDM at a mixer operating temperature of between 170 and 220° C.; said step of adding a cross-linking agent comprises adding 5.3 parts by weight of 40% butyl 4,4-di(tert-butylperoxy) valerate powder on calcium carbonate and silica; and, additionally comprising steps, performed prior to said step of adding a cross-linking agent, of adding 1.2 parts by weight polyethylene wax; adding 0.6 parts by weight ZnO; adding 1.2 parts by weight MgO; adding 12.0 parts by weight carbon black; and adding 3.5 parts by weight TMPTMA. In some embodiments it may be preferable to use a sulfur vulcanization system in place of the peroxide vulcanization system.

BRIEF DESCRIPTION OF THE DRAWINGS

The invention will now be described with reference to the drawings, wherein.

DETAILED DESCRIPTION OF THE PREFERRED EMBODIMENTS

Figure 1:
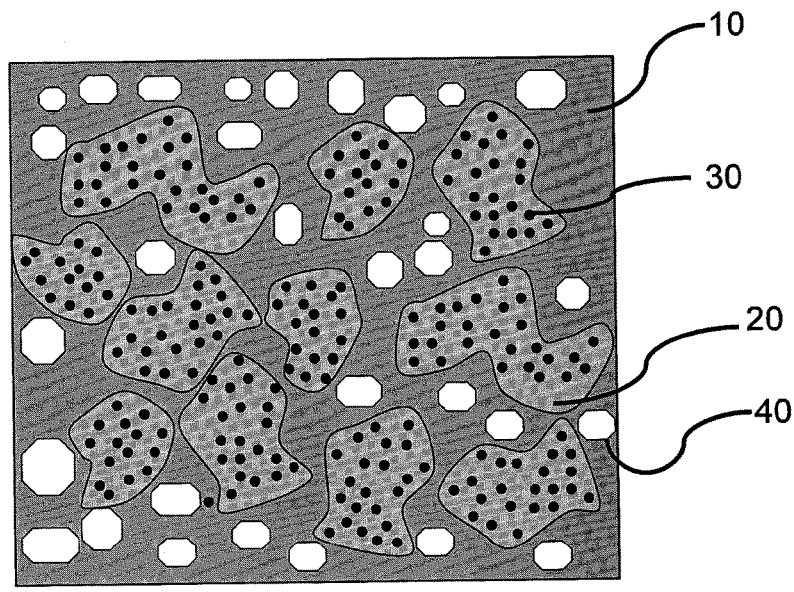
FIG. 1 presents a schematic illustration of the microscopic structure of a composite material according to the present invention.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figures and described in the specification and examples, but only as indicated in the accompanying claims, with the proper scope determined only by the broadest interpretation of said claims.

As used herein, the term "cross-linking" refers to any process that bonds chains of a polymer one to another. "Vulcanization" of rubber is thus one example of "cross-linking" as the term is used herein.

As used herein, with reference to inorganic compounds, the term "metal" is considered to include semi-metals such as, but not limited to, silicon.

The inventors have discovered, surprisingly, that a combination of rubber and TPV/thermoplastic incorporating microparticles of rubber/thermoplastic incorporating microparticles of thermoplastic (cured or uncured) provides the final elastomer product with physical properties such as stiffness, elasticity, and rheological properties that are superior either to that of rubber or TPV alone. In addition, the precursor combines desirable plastic properties of TPV with the ability of rubber to tolerate fillers such as carbon black. In some embodiments, the precursor is free of plasticizers or other additives that may leach out during use, cause formation of bubbles in the elastomer sheet, etc.

In addition to being able to tolerate fillers such as carbon black, the elastomer materials can also tolerate a dispersion of microscale particles and/or microcapsules of phase change materials. The resulting composite has a significantly higher heat capacity (typically 2.5-5.1 kJ kg$^{-1}$K$^{-1}$) than normal rubbers and elastomers (typically ~2 kJ kg$^{-1}$K$^{-1}$) and hence is suitable for uses including as a thermal energy storage material.

Production of the Elastomer

The inventors have found that the properties of a wide range of rubbers can be beneficially modified by inclusion of thermoplastic vulcanizates (TPVs) and/or thermoplastics into which microparticles of rubber (which may be recycled rubber) have been incorporated. Non-limiting examples of rubber useful for the present invention include natural rubber (NR), nitrile butadiene rubber (NBR), hydrogenated nitrile butadiene rubber (HNBR), carboxylated nitrile rubber (XNBR), butyl rubber (IIR), chlorobutyl rubber (CIIR), bromobutyl rubber (BIIR), polychloroprene (CR), styrene-butadiene rubber (SBR), polybutadiene (BR), ethylene-propylene-diene tripolymer (EPDM), ethylene-propylene rubber (EPM), silicone rubber, polyurethane rubber (PU), acrylic rubber (ACM), ethylene vinylacetate copolymer rubber (EVM), and mixtures thereof.

Non-limiting examples of TPVs that have been found useful for modifying the properties of the rubber include polypropylene-EPDM blends (ppEPDM), silicone-thermoplastic blends such as commercially available TPSiV™ (Dow), and styrene-based TPVs such as commercially available MULTIFLEX® (Dow), poly(styrene-butadiene-styrene) (SBS), styrene isoprene butadiene (SIBS), acrylonitrile butadiene styrene (ABS), styrene-ethylene-butylene-styrene copolymer (SEBS), polyethylene/EPDM (peEPDM), polyethylene/EPM (peEPM), polyurethane (PU), polyamide/acrylic rubber (paACM), polyoxymethylene/nitrile rubber (pomNBR), and thermoplastic polyester elastomer/ethylene-vinylacetate copolymer rubber (tpc-etEVM).

Rubber/TPV formulations have significantly reduced swelling and leaching relative to formulations based on one or the other of the materials. In addition, the physical properties of the final product can be controlled by the level of cross-linking, which can be controlled by the amount of cross-linking agent added or the cross-linking conditions.

It is thus within the scope of the invention to provide a precursor to such an elastomer composition. In some embodiments of the invention the precursor comprises cross-linkable rubber, at least one TPV, and at least one cross-linking agent. In preferred embodiments of the invention, the rubber and TPV are chosen from the materials given above. In preferred embodiments, the weight ratio of the rubber to the TPV is between 90:10 and 10:90. In more preferred embodiments, the weight ratio of the rubber to the TPV is between 70:30 and 30:70. The Durometer hardness of the elastomer depends inter alia on the rubber:TPV ratio; thus, the specific ratio used in a given sample of precursor will depend on the desired properties of the final elastomer product. The properties of the elastomer product derived from the precursor of the present invention can thus be fine-tuned to suit the needs of the particular application (see Example 5 below).

The cross-linking agent may be any appropriate agent known in the art. Non-limiting examples of suitable cross-linking agents include sulfur, sulfur donor, peroxides, phenolic resins, amines, and acrylates.

The cross linking co-agent may be any appropriate agent known in the art. Non-limiting examples of sulfur donor cross-linking agents include dithiocarbamates, thiurams, thiazoles, guanidines, and sulfenamides.

In the most preferred embodiments of the invention, however, sulfur cross-linking agents are used, as these materials can react with double carbon-carbon bonds and thus produce a higher curing density and better compression set. In addition, some peroxide agents produce less odor during the cross-linking than do sulfur cross-linking agents. Non-limiting examples of peroxide cross-linking agents that have been found useful in the present invention include butyl-4,4-di(tert-butylperoxy)valerate; di(tert-butyl) peroxide; di(tert-butylperoxyisopropyl)benzene; dicumyl peroxide; 2,5-dimethyl-2,5-bis-(tert-butylperoxy)hexane. Non-limiting examples of cross-linking co-agents that can be utilized with peroxides include BMI-MP, EDMA, 1,2-BR, DATP, DVB, TAC, TAIC, and TAP. The cross-linking agent may be supported on granules of inert material such as silica. Since the physical properties of the final elastomer product depend on the level of cross-linking, the amount of cross-linking agent added to the precursor will depend on the specific application. In typical embodiments, the amount of cross-linking agent is on the order of 5% by weight relative to the total weight of rubber and TPV.

The final elastomeric product produced by curing the precursor need not be fully cross-linked. Thus, in some embodiments of the invention, the final elastomeric product is substantially fully cross-linked, while in others, it is only partially cross-linked.

In some embodiments of the invention, the precursor also comprises a cross-linking co-agent to sulfur cure. The cross-linking co-agent may be any such agent known in the art. In some embodiments of the invention, the cross-linking co-agent comprises stearic acid, zinc oxide and sulfur donor.

In some embodiments of the invention, the precursor also comprises a cross-linking co-agent. The cross-linking co-agent may be any such agent known in the art. In some embodiments of the invention, the cross-linking co-agent comprises scrylate, a triazine, or 1,8-diazabicyclo-5,4,0-undec-7-ene (DBU) with saturated dibasic acids. In preferred embodiments of the invention, acrylate cross-linking co-agents are used. A non-limiting example of a suitable cross-linking co-agent is trimethyl-ol-propane-trimethylacrylate (TMPTMA).

In some embodiments of the invention, the precursor also comprises a filler. In some embodiments, the precursor comprises between 1% and 70% by weight of filler. The filler may be any appropriate material known in the art. Non-limiting examples of fillers that can be used with the precursor of the present invention include natural expanded graphite, graphite, carbon black, silica, mica, kaolin, clay, coal dust, lignin, talc, $BaSO_4$, $CaCO_3$, $Al(OH)_3$, $Mg(OH)_2$, ZnO, and MgO.

In some embodiments of the invention, the precursor additionally contains natural expanded graphite. Typically, in those embodiments in which natural expanded graphite is included, the precursor comprises between 1% and 60% natural expanded graphite by weight. In preferred embodiments in which natural expanded graphite is included, the precursor comprises between 5% and 35% natural expanded graphite by weight.

In preferred embodiments of the invention, the total weight of additives other than rubber and TPV does not exceed the total weight of rubber and TPV. The inventors have found that addition of excessive amounts of additives leads to excessive compound hardness and unacceptably low elasticity and elongation.

In some embodiments, the precursor contains a plasticizer. Any plasticizer known in the art that is appropriate for use with rubber and TPV and that is compatible with the rubber(s) and TPV(s) used may be used.

In other embodiments, the precursor is free of plasticizers such as mineral oil. Indeed, the inventors have found that for some applications, such additives can actually reduce the quality of the precursor or final elastomer product, as they tend to come to the surface. They also give compounds that may swell or lose material and may sweat out during long term storage. In many applications, the precursor is bonded to a polyester film, to a fabric, or to a metal. Sweating of plasticizer can reduce the adhesion between the rubber layer and the supporting layer causing debonding during use. In addition, plasticizers can reduce the effectiveness of the residual thermoplasticity of the composition.

It is also within the scope of the invention to disclose an elastomer composition, produced from the precursor by cross-linking. In some embodiments, the TPV is cross-linked either internally or to the polymer chains of the rubber. The cross-linking may be accomplished by any method known in the art. In preferred embodiments, the cross-linking is initiated either by heating or by irradiation with UV light.

The elastomers of the present invention can also be produced as a coating on a continuous roll of fabric. In some embodiments, the precursor mixture is mixed onto a fabric base while being fed through a calender. In other embodiments, the mixture is dissolved in a suitable solvent. A continuous roll of material can then be produced from the solution by methods well-known in the art such as spread-coating or by dipping the fabric in the solution.

It is also within the scope of the invention to disclose a method for making a precursor for an elastomer material. The method comprises (a) mixing rubber and at least one material selected from the group consisting of TPV, thermoplastic incorporating microparticles of rubber and any combination thereof; and (b) adding at least one cross-linking agent. In some embodiments of the method, it also comprises a step of adding a cross-linking co-agent. In some embodiments of the method, it also comprises one or more steps of adding additional components such as carbon black, natural expanded graphite, polymers, or inorganic fillers such as silica, mica, kaolin, clay, coal dust, lignin, talc, $BaSO_4$, $CaCO_3$, $Al(OH)_3$, $Mg(OH)_2$, ZnO, or MgO.

In some embodiments of the method, the mixing is performed in an apparatus such as an internal mixer or an extruder. In preferred embodiments, the operating temperature of the apparatus is above the melting point of the thermoplastic component (typical operating temperatures are 90-300° C.). In preferred embodiments of the invention, the mixing continues at least until a homogeneous mixture is obtained. In some embodiments of the invention, the mixing continues until a constant stress reading is obtained in the mixer.

In some embodiments of the invention, the method includes additional steps of introducing the material extracted from the mixer into a mill, preferably a two roller mill, and milling the material. In preferred embodiments, the addition of cross-linking agent (and cross-linking co-agent in those embodiments that include this step) occurs concomitant with the introduction of the material into the mill.

It is also within the scope of the invention to disclose a method for making an elastomeric material that comprises rubber into which a TPV has been incorporated. The method comprises preparing a precursor according to any of the embodiments disclosed above, and cross-linking the cross-linkable rubber. The cross-linking may be initiated by any method known in the art. Non-limiting examples include heating and irradiating with UV light. In some embodiments, the method additionally comprises a step of cross-linking the TPV, either internally or to the rubber.

It is also within the scope of the invention to disclose an elastomer composition comprising rubber and TPV that is the product of the method disclosed above. The properties of the elastomer composition (hardness, elasticity, etc.) can be tuned by appropriate choice of the rubber:TPV ratio and the amount and type of cross-linking agent in the precursor, and the extent of cross-linking in the elastomer itself.

Thermal Energy Storage Materials

The present invention discloses the use of the elastomer compositions discussed in detail above as the basis of thermal energy storage materials. In some embodiments, the elastomer itself is used as a thermal energy storage material. The heat capacity is sufficiently high that they can transfer heat without undergoing a phase change. These materials can be used to temperatures of 350° C., significantly higher than elastomers known in the art. In the most preferred embodiments, the elastomers contain microparticles of a material such as carbon black, graphite, graphene, natural expanded graphite, boron nitride, or aluminum nitride.

In other embodiments, the elastomer serves as a matrix into which a phase change material (e.g. an encapsulated metal salt) is dispersed. In preferred embodiments, microparticles of one or more phase change materials are dispersed (homogeneously in the most preferred embodiments) within the elastomer matrix. Because the phase change material can be selected by the user, the temperature ranges available can be set by selection of a phase change material with the desired thermal properties. By adjusting the melting/crystallization temperature of the composite, a broad useful temperature interval can be obtained with the same chemical components. The composites of the present invention also have the advantage of being susceptible to minimal hysteresis, allowing for management of the volume expansion of the phase change material (PCM).

One non-limiting example of a salt system that can be used as a PCT is the binary system LiOH/KOH. This system has a number of beneficial characteristics. It can be adapted for a wide variety of temperature ranges. For example, a mixture with 46.5% LiOH (w/w) can be used to store energy at 314° C., while a mixture with 78.92% LiOH (w/w) would be preferred over the temperature interval of 314-450° C. In addition, this salt system has a very high energy density. For example, the latent heat of a mixture comprising 46.5% LiOH is 535 kJ/kg, while the enthalpy change of melting a mixture comprising 78.92% LiOH is 1100 kJ/kg. The high latent heat of the system allows for a decrease in the size of the system with a consequent reduction in construction costs. Furthermore, it has a maximum relative volume expansion of less than 9%, while retaining highly enhanced heat transfer ability. This system shows insignificant hysteresis. Consequently, the resulting storage systems do not require different operating conditions for charging and discharging. Moreover, the system appears to be stable (no degradation of the energy storage properties over time).

The elastomers have a relatively high modulus of elasticity and a resistance to compression that ensures the dimensional stability of the structure when a salt is dispersed within them and it is subjected to mechanical stress which results in melting of the salt (volume expansion). These materials also have a highly interconnected porosity, allowing for easy filling of the pores.

Low cost thermal energy storage is essential for solar power to become viable in large capacities. The following are important features of a good thermal storage system: high energy density, good heat transfer, a mechanically and chemically stable storage medium, and minimum thermal losses. PCMs create an opportunity for storing large amounts of thermal energy in a small amount of material, thus significantly reducing the costs. As such, a thermal energy storage material is disclosed, which comprises microparticles of inorganic salt phase change materials (in preferred embodiments, formed into micropellets) dispersed within the elastomer matrix. In preferred embodiments, the pellets are encapsulated in a metal oxide.

In some embodiments of the invention, the phase change microencapsulated salt pellets are surface functionalized through hexane and silane functionalization. In some embodiments of the invention, the phase change microencapsulated salt pellet includes a void space, permitting the phase change material additional space during melting. In preferred embodiments of the invention, the void space is optionally between about 15 to about 35% of the volume of the microencapsulated pellet, and can optionally be evacuated of ambient air. Because the PCMs melt during heat absorption, a high temperature polymer, such as a polyimide stable at temperatures of over 500° C., is coated over the exterior surface of the phase change microencapsulated salt pellet. In some variations, the polyimide coating also includes an additive, such as a nickel, silicon carbide, or carbon. A metal oxide or graphene-metal oxide composite encapsulant is disposed on the exterior of the polyimide coating. Metal oxide encapsulants include silicon dioxide, titanium dioxide, zinc oxide, calcium oxide, barium oxide, titanium dioxide-silicon dioxide composite, cerium dioxide, iron (III) trioxide, aluminum (III) oxide, magnesium oxide, lithium cobalt dioxide, lithium nickel dioxide, zinc oxide, zirconium dioxide, lithium, titanium oxide, lithium aluminum manganese oxide, lithium nickel manganese oxide, lithium dimanganese tetroxide, indium tin oxide, or combinations thereof. The encapsulant optionally includes graphene in the metal oxide as a composite. Graphene is a one-atom-thick sheet of $sp^2$-bonded carbon atoms in a honeycomb crystal lattice, which is a current focus of materials science and condensed matter physics research (Wu, et al. Graphene/metal oxide composite electrode materials for energy storage. Nano energy. 2012(1); 107-131, which is hereby incorporated by reference). With the addition of pentagons it can be wrapped into a spherical fullerene. As a consequence of its crystal structure, any low-energy quasiparticles in the material obey a linear dispersion relation. Graphene has the fastest electron mobility of ~15,000 $cm^2$ $V^{-1}$ $cm^{-1}$ or $10^6$ $\Omega cm$, a high mobility of temperature-independent charge, and superior thermal conductivity of 5000 W $m^{-1}$ $K^{-1}$.

The phase change salt micropellets can be formed by any method known in the art, e.g. by wet granulation, by briquetting, or by use of a power press or a pelletizer. Typical fluids for wet granulation include water, ethanol and isopropanol either alone or in combination. In the power press method, which is similar to the briquetting process, dry powder is pressed between dies to produce pellets of required shape and size. Alternatively, the briquetting method may be used to form the pellet. This method is particularly preferred for hygroscopic PCMs because it does not require binders. Non-limiting examples of formed shapes include cylindrical, spherical, and oblong.

The void space, in those pellets that include one, can be formed in the phase change salt pellet prior to polyimide coating by any method known in the art such as drilling, briquetting, or die casting the pellet with a void space. Where a void space was formed, the void space may be evacuated of ambient air, or pressure in the void space reduced by inserting a metal wire into the phase change salt pellet during fabrication of the pellet, heating the phase change salt pellet, removing the metal wire from the phase change salt pellet, permitting heated gases to escape from the void space, and applying the polyimide coating to the phase change salt pellet to seal the void space.

Functionalization of the phase change microencapsulated salt pellet can be performed by any method known in the art. In preferred embodiments, it is achieved by soaking the phase change microencapsulated salt pellet in a solution of hexane and silane for 24 hours prior to applying the polyimide coating to the phase change microencapsulated salt pellet.

In preferred embodiments of the invention, the exterior of the phase change salt micropellet is coated in a high temperature polymer such as polyimide. In some embodiments, the polyimide is mixed with N-methyl-2-pyrrolidinone and a plasticizer in organic solvent and applied in a thin layer onto the phase change salt micropellet by dip coating, spray coating or brushing. In some embodiments, the polyimide includes additives, such as nickel, silicon carbide, or carbon. Subsequent to the coating, the polyimide is cured, for example at up to 250° C. for 2 hours.

In preferred embodiments of the invention, the exterior of the polyimide coating is then encapsulated with a metal oxide or a graphene-metal oxide composite. Exemplary metal oxide encapsulants include silicon dioxide, titanium dioxide, zinc oxide, calcium oxide, barium oxide, titanium dioxide-silicon dioxide composite, cerium dioxide, iron (III) oxide, aluminum (III) oxide, magnesium oxide, lithium cobalt dioxide, lithium nickel dioxide, zinc oxide, zirconium dioxide, lithium, titanium oxide, lithium aluminum manganese oxide, lithium nickel manganese oxide, lithium dimanganese tetroxide, indium tin oxide, or combinations thereof. In some variations, a metal oxide precursor, such as a sol-gel silicon dioxide precursor such as tetraethyl orthosilicate or tetraethyl orthosilicate containing graphene, is obtained and mixed with 3-aminopropyltriethoxysilane to form a silicate precursor, and polyimide-coated phase change salt pellets placed into the silicate precursor. The silicate precursor is heated, ethanol and hydrochloric acid added to the silicate precursor, the silicate precursor neutralized with sodium hydroxide, and the sol-gel silicon dioxide precursor encapsulated on the polyimide coated phase change salt pellet. The metal oxide coating is optionally cured at various temperatures ranging up to 250° C., such as 250° C. at a rate of 4° C./minute for two hours, thereby forming a $SiO_2$ shell on the pellet through self-assembly, hydrolysis, and simultaneous chemical oxidation at various temperatures.

Reference is now made to FIG. 1, which shows a schematic diagram (not to scale) of the structure of one non-limiting embodiment of a composite material according to the present invention. The composite comprises a heat conductive rubber or rubber-ceramic matrix 10. In preferred embodiments, thermoplastic PCM 20 is incorporated into this matrix. In the most preferred embodiments, microparticles 30 (e.g. of rubber or rubber-ceramic) are incorporated into PCM 20, e.g. by encapsulation. In preferred embodiments, the composite also includes void spaces 40 for heat exchange.

Figures 2A, 2B:
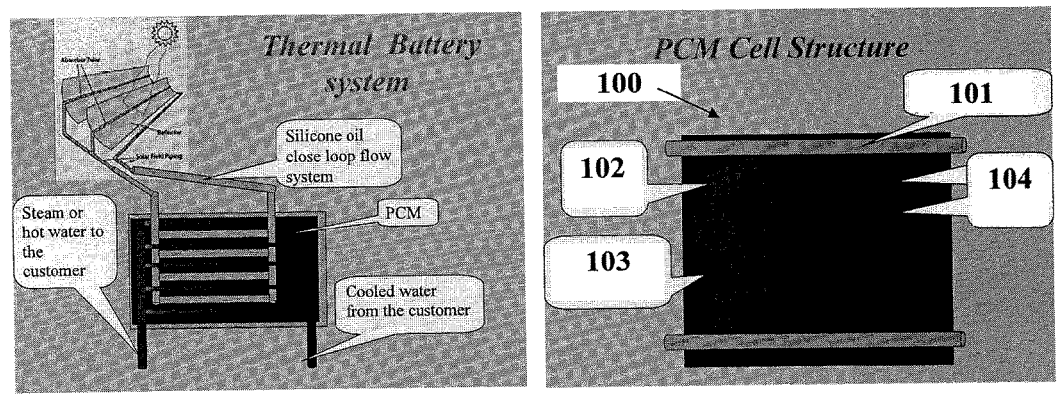
FIG. 2 presents schematic illustrations of uses of the precursor herein disclosed in phase change materials applications.

Reference is now made to FIG. 2A, which presents a schematic diagram of the use and function of a PCM in such a system. "Low temperature" solar energy storage systems use materials such as water or paraffin to store solar thermal energy. These systems are relatively inexpensive, but of very low efficiency, and are used mostly in hot water and air conditioning systems. "High temperature" systems have higher energy efficiency, and can be used for electricity and steam production, but tend to be more complicated and expensive. The materials herein disclosed provide an efficient and economical solution in the intermediate temperature region (about 120° C.-280° C.).

Reference is now made to FIG. 2B, which presents a schematic illustration of a PCM that uses the materials of the current disclosure. The energy storage system illustrated in the figure is composed of heat exchange elements that are enclosed in a PCM matrix. The form in which the material is packaged minimizes the effect of the "Stefan problem" (the problem of the transfer of heat in a system undergoing a phase transition). A typical PCM cell, such as that shown in the illustration, comprises four basic structural elements: heat exchange units (e.g. pipes) 101, for transferring energy from the cell to the environments; rubber-like microparticles 104 located within the cell; a matrix 102 of thermoplastic material of the present invention; and a rubber-like matrix 103. The chemistry of matrix 103 can be adjusted to the target working temperature.

Thermoplastic material 102 undergoes a phase change (storage or release of latent heat) during the process of energy consumption or release. The other structural elements of the system do not move; thus, the heating/cooling cycle does not change the size or shape of cell 100. Rubber-like matrix 103 does not undergo a phase transfer, and its only contribution to the storage or release of energy is via sensible heat (as opposed to the latent heat contribution of PCM 102). This design optimizes heat transfer in the system.

EXAMPLES

The following examples present typical embodiments of the precursor herein disclosed and of methods for its preparation. The examples are presented to illustrate the preparation, properties, and uses of the compositions disclosed herein, and are not in any way to be taken as limiting the scope of the invention as claimed. In the tables given in the examples, the numbers represent the relative amounts by weight of the components of the composition.

Example 1

60 parts by weight of EPDM rubber (ROYALENE 525 grade) were combined with 40 parts by weight of ppEPDM (FORPRENE, obtained from Softer SPA) in a Banbury mixer operating between 190 and 200° C. During the mixing, the following ingredients were added: polyethylene AC6 (1.2 parts by weight); ZnO (0.6 parts by weight); carbon black (12.0 parts by weight); and MgO (1.2 parts by weight).

The entire mixture was mixed until the mixer provided a constant stress reading (approximately 5 minutes of additional mixing). The resulting mixture was removed from the mixer as a homogeneous mass. The mass was then masticated in a "Vals" two roller mill along with 3.5 parts by weight of TMPTMA70 and 5.3 parts by weight of peroxide crosslinking agent (TRIGONOX 17-40B Butyl 4,4-di(tert-butylperoxy)valerate or LUPEROX DC40 dicumyl peroxide). Mastication continued until the material formed into a sheet. The Mooney viscosity of the mixture was 142.2 at 100° C.

Example 2

An elastomeric composition was produced from the precursor formed in Example 1. The sheet removed from the mill was fed in to an extruder at an appropriate temperature to a mold and then fed into an autoclave or press at 150° C.

Example 3

Elastomeric compositions were made by cross-linking of precursors made according to the present invention. The compositions were placed for 40 min in a pneumatic press at 165° C. and 8 atm pressure, and the tensile strength measured. The tensile strength of the compositions of the present invention was typically in the range of 13.7-15.7 MPa (140-160 kg cm$^{-2}$). The tensile strengths of a composition containing all of the components of the present invention except for TPV and of EPDM were measured and found to be about 11 MPa (112-115 kg cm$^{-2}$). The results of this experiment demonstrate that the present compositions have higher tensile strengths than those of the components from which they are made.

Example 4

Calorimetric measurements were made of elastomeric compositions produced by cross-linking of precursors made according to the present invention. The compositions of the precursors are given in Table 1.

TABLE 1

| | Sample Number | |
|---|---|---|
| | B2 - 1 | B2 - 3 |
| Component | | |
| EDPM | 100 g | 100 g |
| ppEPDM | 70 g | 40.18 g |
| carbon black | 20 g | 11.48 g |
| Polyethylene AC6 | 2 g | 2 g |
| ZnO | 1 g | 1 g |
| MgO | 2 g | 2 g |
| TMPTMA70 | 6 g | 6 g |
| crosslinking agent (TRIGONOX 17-40B) | 9 g | 9 g |
| Property | | |
| Mooney Viscosity, 100° C. | 142.2 | 100.1 |
| Mooney Viscosity, 100° C. | 62.0 | 44.0 |

Figure 3:
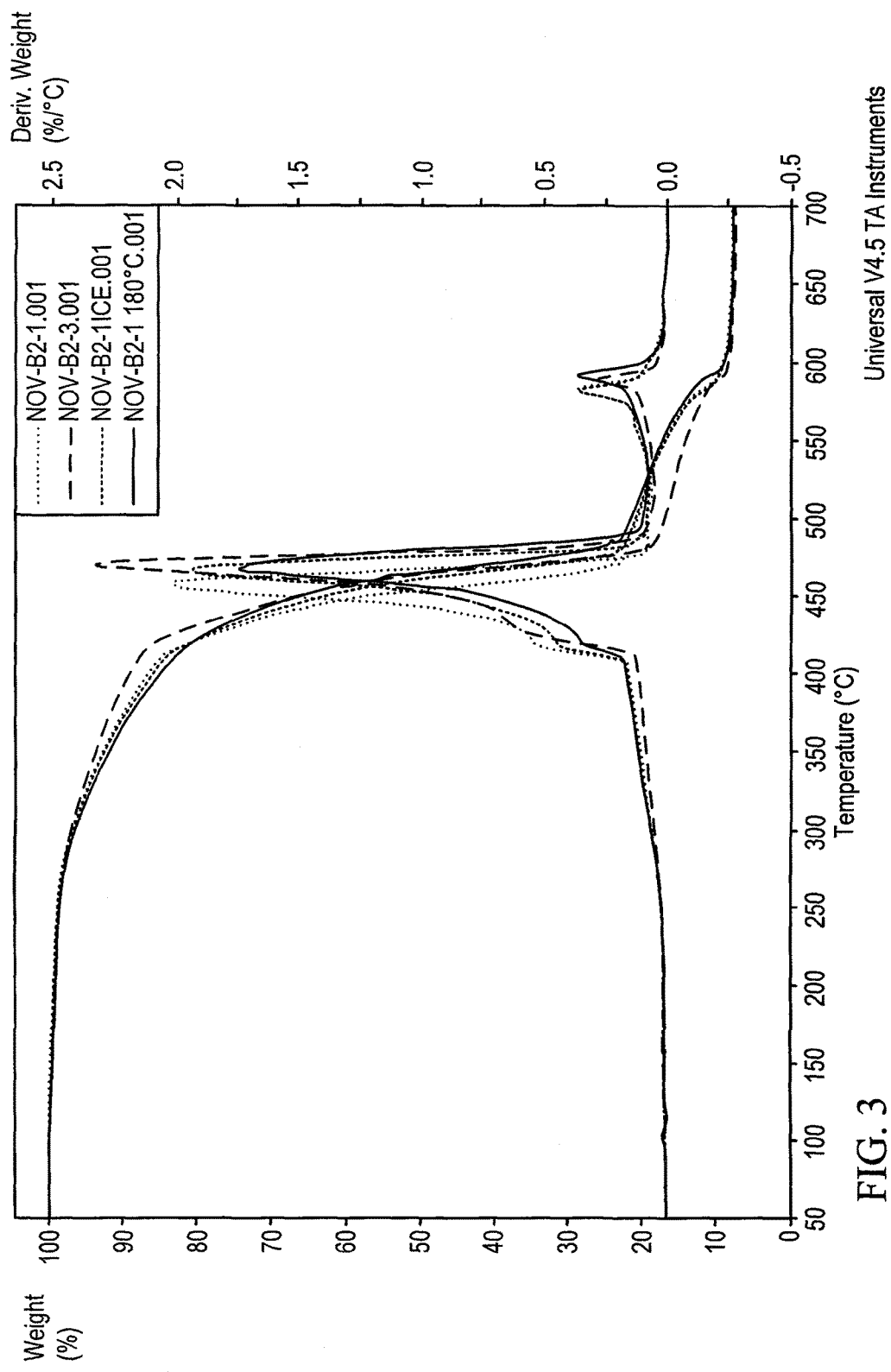
FIG. 3 presents results of TGA analyses of samples of elastomers prepared from a precursor according to one embodiment of the invention disclosed herein.

Reference is now made to FIG. 3, which shows results of thermogravimetric analyses (TGA) of four samples of elastomers made by cross-linking of the precursors listed in Table 1. The decomposition proceeds in two steps; the lower-temperature decomposition (derivative peak at ~450° C.) indicates decomposition of the rubber/TPV component, while the higher-temperature decomposition (derivative peak at 550-600° C.) indicates decomposition of the carbon black component. Noteworthy is that after the decomposition is complete, only ~3% of the original weight remains. This result is in contrast to typical rubber compositions, in which ~30% of the original material remains after decomposition.

Figure 4:
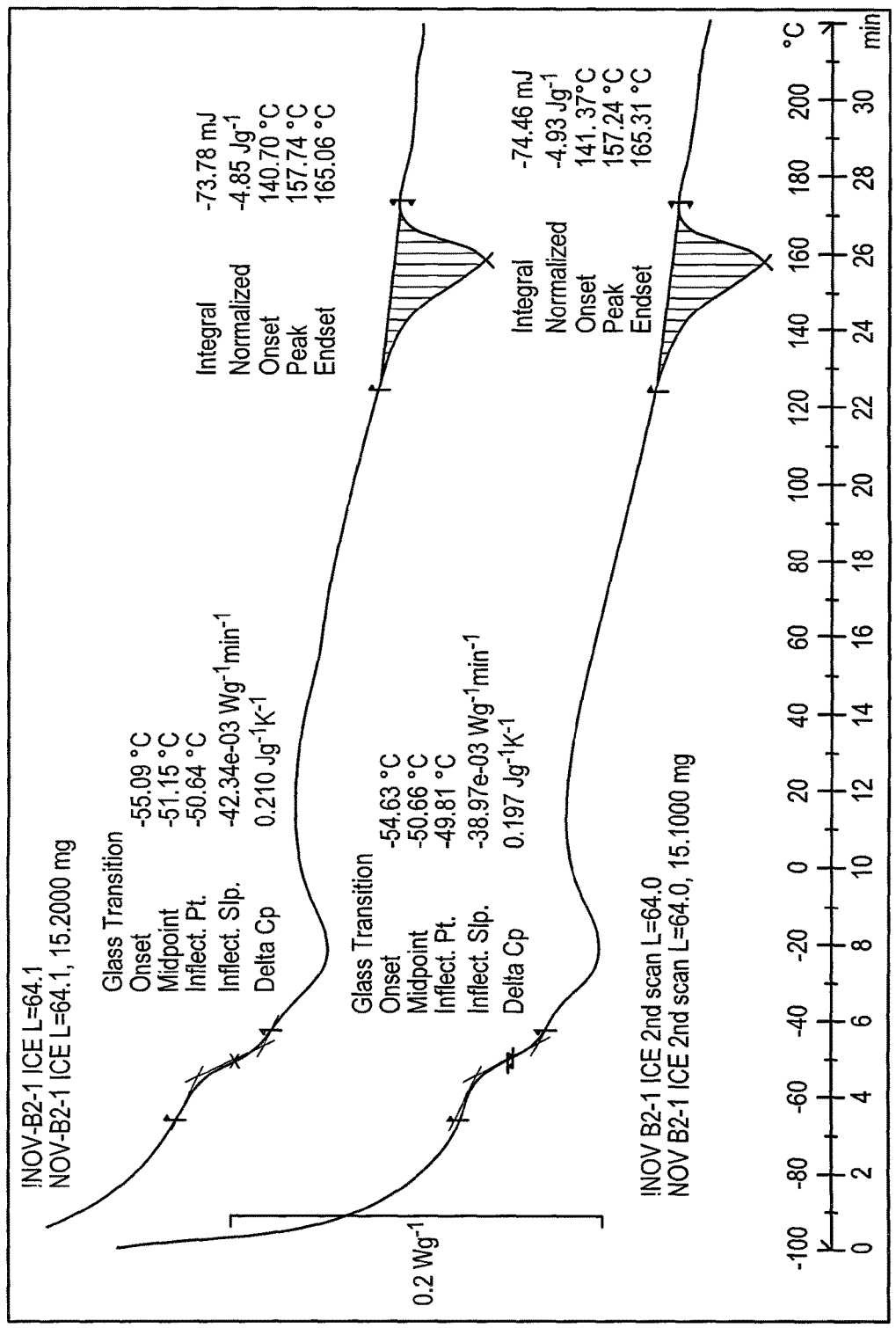
FIG. 4 presents results of a DSC analysis of a sample of an elastomer prepared from a precursor according to one embodiment of the invention disclosed herein.

Reference is now made to FIG. 4, which shows a differential scanning calorimetry (DSC) analysis of sample "B2-1" of an elastomer made by cross-linking of the precursors listed in Table 1. The DSC results demonstrate that, unlike typical rubber compositions known in the art, elastomers produced from the precursor disclosed herein show a single definite melting point.

Example 5

Figure 5A:
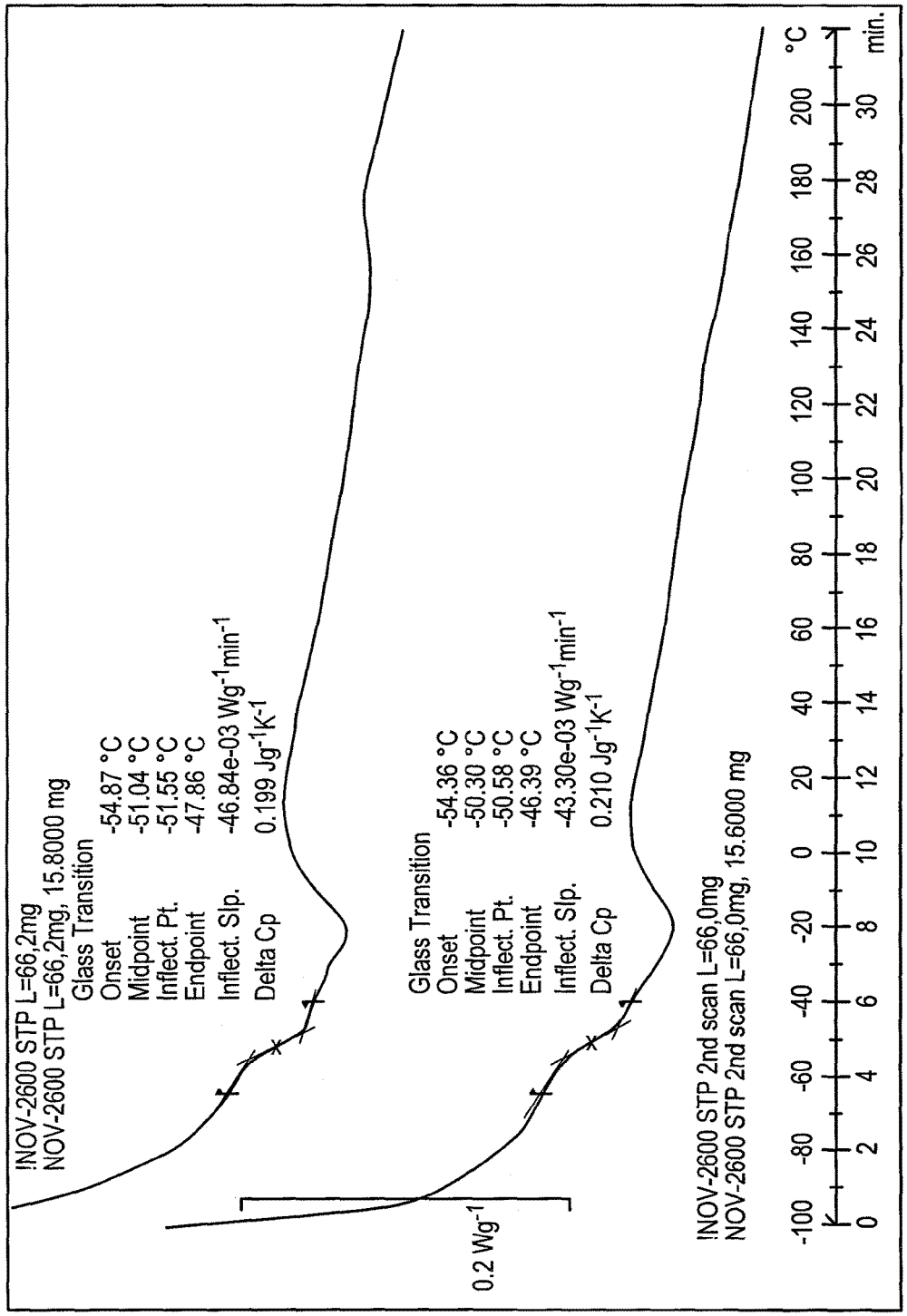
FIG. 5 presents results of DSC analyses of individual components of the compositions herein disclosed.
Figure 5B:
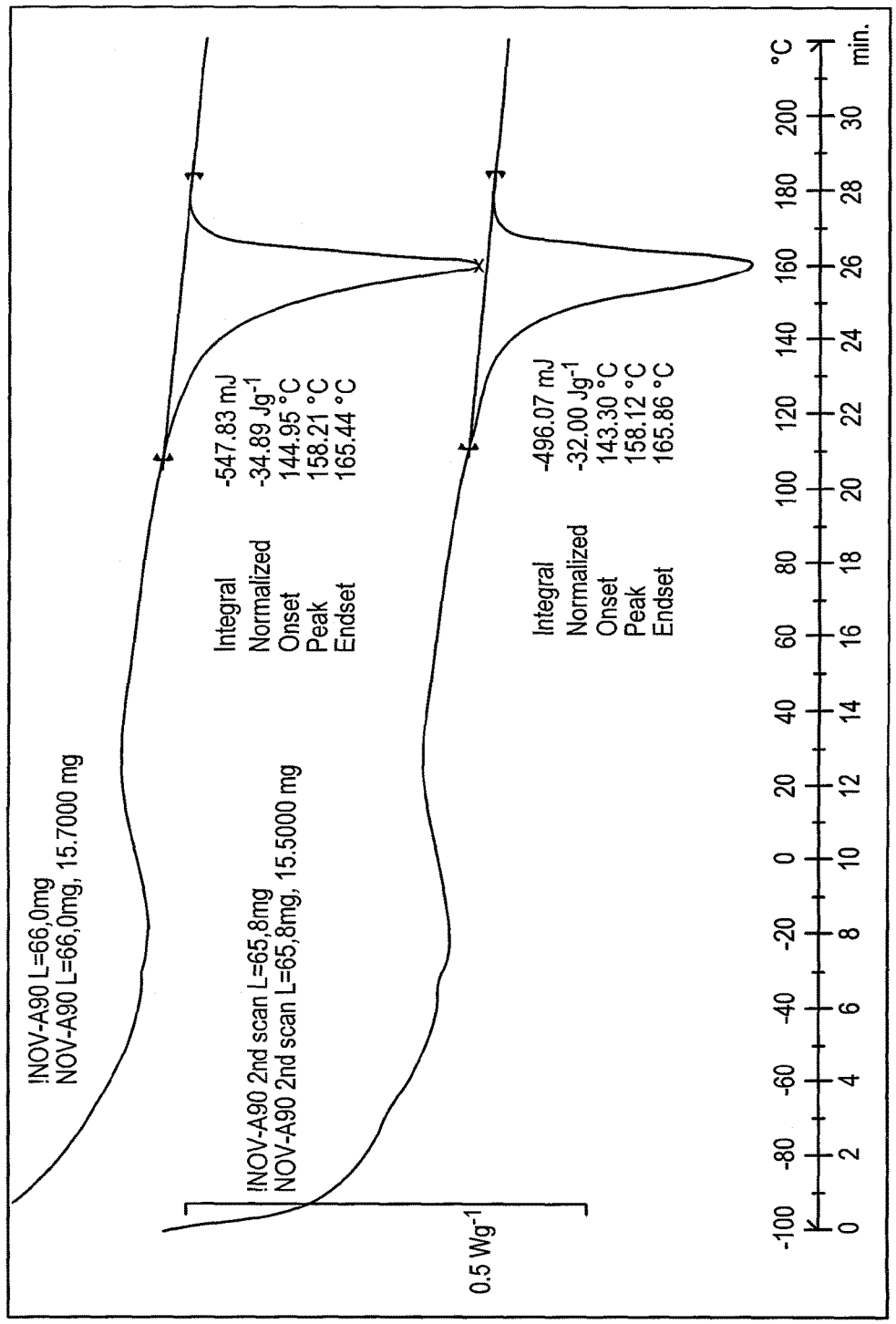

As was disclosed above, the physical properties of the precursor of the present invention can be fine-tuned by appropriate choice of the relative amounts of the components, particularly the rubber and TPV. A series of compositions was prepared, and the Shore A hardness of the compositions was measured in a pneumatic press at 165° C. (40 min, 8 atm) and at 220° C. (20 min, 4 atm). The results are summarized in Table 2.

component of the compositions of the present invention. Reference is now made to FIG. 5A, which presents a DSC analysis of ppEDM; and FIG. 5B, which presents a DSC analysis of a composition of a composition comprising EPDM and a cross-linking agent, but no TPV. As can be seen by comparison of the DSC results shown in FIG. 5 to those shown in FIG. 4, the low-temperature thermal behavior of the compositions of the current invention is comparable to that of rubber (or rubber containing similar fillers), while the high-temperature behavior is comparable to that of TPV. Furthermore, the compositions of the present invention do not show an externally visible melt at high temperature. That is, the improved physical properties do not come at the expense of any noticeable change in Thermal properties.

Example 7

The effects of changing the type and amount of filler on the properties of the composition were investigated. Relevant physical properties of some exemplary compositions are summarized in Table 3.

TABLE 2

| | Sample No. | | | | | | |
|---|---|---|---|---|---|---|---|
| | B3' | B3-1 | B3-2 | B2' | B2-1 | B2-2 | B2-3 |
| Component | | | | | | | |
| EPDM | 100 g | 100 g | 100 g | 100 g | 100 g | 100 g | 100 g |
| ppEPDM | 50.1 g | 70 g | 60.06 g | 50.1 g | 70 g | 60.06 g | 40.18 g |
| Carbon black | 14.31 g | 20 g | 17.16 g | 14.31 g | 20 g | 17.16 g | 11.48 g |
| Polyethylene AC6 | 2 g | 2 g | 2 g | 2 g | 2 g | 2 g | 2 g |
| ZnO | 1 g | 1 g | 1 g | 1 g | 1 g | 1 g | 1 g |
| MgO | 2 g | 2 g | 2 g | 2 g | 2 g | 2 g | 2 g |
| TMPTMA70 | 6 g | 6 g | 6 g | 6 g | 6 g | 6 g | 6 g |
| crosslinking agent (TRIGONOX 17-40B) | — | — | — | 9 g | 9 g | 9 g | 9 g |
| crosslinking agent (LUPEROX DC40) | 9 g | 9 g | 9 g | — | — | — | — |
| Property | | | | | | | |
| Shore Hardness A vulc. at 165° C. | 70.6 | 75.1 | 72.7 | 72.2 | 75.2 | 74.7 | 70.6 |
| Shore Hardness A vulc. at 220° C. | 66.6 | 71.9 | 67.4 | 69.7 | 71.9 | 71.0 | 68.5 |

Example 6 calorimetric analyses were performed of a series of compositions in which each composition was lacking at least one

TABLE 3

| | Sample No. | | | | |
|---|---|---|---|---|---|
| | MN10-5 | MN10-1 | MN10-2 | MNC1-1 | MNC1-2 |
| Component | | | | | |
| EPDM | 100 g | 100 g | 100 g | 100 g | 100 g |
| ppEPDM | 100 g | 100 g | 100 g | 70 g | 70 g |
| Carbon black | | 20 g | 40 g | | |
| Silica | | | | | 20 g |
| Polyethylene AC6 | 2 g | 2 g | 2 g | 2 g | 2 g |
| ZnO | 1 g | 1 g | 1 g | 1 g | 1 g |
| MgO | 2 g | 2 g | 2 g | 2 g | 2 g |

TABLE 3-continued

|  | Sample No. | | | | |
| --- | --- | --- | --- | --- | --- |
|  | MN10-5 | MN10-1 | MN10-2 | MNC1-1 | MNC1-2 |
| TMPTMA70 | 4.6 g | 6 g | 6 g | 6 g | 6 g |
| crosslinking agent (TRIGONOX 17-40B) | 7 g | 9 g | 9 g | 9 g | 9 g |
| Property | | | | | |
| Shore Hardness A vulc. at 165° C. | 67.7 | 81.3 | 89.2 | 63.4 | 70.5 |
| Tensile Strength MPa LONG. | 8.93 | 14.12 | 18.37 | 6.15 | 11.32 |
| Elongation at break (%) | 221.0 | 128.0 | 52.0 | 200.0 | 313.0 |
| Abrasion TABER (mg) | 0.006 | 0.018 | 0.039 | 0.039 | 0.080 |

As can be seen from the results summarized in the table, both carbon black and silica improve the physical properties of the material. When silica is used as the filler, however, the precursor has a lower resistance to abrasion in comparison to a precursor that is identical except for the use of carbon black as the filler. In addition, the surface of the rubber is rougher when silica is used as the filler. The use of TPV as a filler improves both the surface roughness during ablation and the abrasion resistance.

Example 8

The effects of addition of different amounts of carbon black on the physical properties of the resulting composition were investigated. Results are summarized in Table 4.

TABLE 4

|  | Sample No. | | | | |
| --- | --- | --- | --- | --- | --- |
|  | MN10-1 | MN10-2 | MN10-3 | MN10-4 | MN10-5 |
| Component | | | | | |
| EPDM | 100 g | 100 g | 100 g | 100 g | 100 g |
| ppEPDM | 100 g | 100 g | 100 g | 100 g | 100 g |
| Carbon black | 20 g | 40 g | 30 g | 35 g | 0 g |
| Polyethylene AC6 | 2 g | 2 g | 2 g | 2 g | 2 g |
| ZnO | 1 g | 1 g | 1 g | 1 g | 1 g |
| MgO | 2 g | 2 g | 2 g | 2 g | 2 g |
| TMPTMA70 | 6 g | 6 g | 4.6 g | 4.6 g | 4.6 g |
| crosslinking agent (TRIGONOX 17-40B) | 9 g | 9 g | 7 g | 7 g | 7 g |
| Property | | | | | |
| Shore Hardness A vulc. at 165° C. | 81.3 | 89.2 | 81.6 | 83.6 | 67.7 |
| Tensile Strength MPa LONG. | 14.12 | 18.37 | 14.71 | 13.18 | 8.93 |
| Elongation at break (%) | 128.0 | 52.0 | 131.0 | 99.2 | 221.0 |
| Abrasion TABER (mg) | 0.018 | 0.039 | 0.012 | 0.011 | 0.006 |
| Resistance Ω | >400 | 82 | 200 | 100 | >40 G |

As expected, addition of conductive carbon black to the EPDM-TV matrix lowers the electrical resistance. While addition of carbon black also increases the strength and hardness of the precursor, it also reduces the elongation at break of the rubber.

Example 9

The effect of changing the EPDM used in the precursor was investigated. Typical results are summarized in Table 5.

TABLE 5

| | | Sample No. | | | | | |
|---|---|---|---|---|---|---|---|
| | | MN10-4 | MN11-01 | MN12-01 | MN13-01 | MN14-01 | MN19-01 |
| Component | | | | | | | |
| EPDM | ROYALENE 525 | 100 g | | | | | 100 g |
| | VISTALON 404 | | 100 g | | | | |
| | VISTALON 706 | | | 100 g | | | |
| | KEP 110 | | | | 100 g | | |
| | KEPA 1130 | | | | | 100 g | |
| | ppEPDM | 100 g | 100 g | 100 g | 100 g | 100 g | |
| | Carbon black | 35 g | 35 g | 35 g | 35 g | 35 g | 35 g |
| | Polyethylene AC6 | 2 g | 2 g | 2 g | 2 g | 2 g | 2 g |
| | ZnO | 1 g | 1 g | 1 g | 1 g | 1 g | 1 g |
| | MgO | 2 g | 2 g | 2 g | 2 g | 2 g | 2 g |
| | TMPTMA70 | 4.66 g | 4.66 g | 4.66 g | 4.66 g | 4.66 g | 4.66 g |
| | crosslinking agent (TRIGONOX 17-40B) | 7 g | 7 g | 7 g | 7 g | 7 g | 7 g |
| Property | | | | | | | |
| | Shore Hardness A vulc. at 165° C. | 83.6 | 82.9 | 81.6 | 84.8 | 88.7 | 85.7 |
| | Tensile Strength MPa LONG. | 13.18 | 6.43 | 5.45 | 4.44 | 8.10 | 15.16 |
| | Elongation at break (%) | 99.2 | 35.7 | 86.0 | 21.5 | 21.3 | 114.2 |
| | Abrasion TABER (mg) | 0.011 | 0.008 | 0.021 | 0.004 | 0.043 | 0.013 |
| | Resistance Ω | 100 | 370 | 274 | 415 | 6000 | 45 |

Inserting polypropylene (pp), which is found in the TPV, into an EPDM matrix does not produce any reduction in the properties of the rubber, and even improves some of the characteristics. The introduction of polypropylene into an EPM matrix does not produce a similar improvement. The presence of MAH produces even less desirable properties.

As can be seen from the results, TPV additive improves the properties of EPDM rubber without any other additives. It also provides improved properties when working with the precursor in a laser engraving machine. Adding TPV to EPM and to MAH grafted EPM should improve the physical properties and durability of the rubber at high temperatures as well.

Example 10

The effect on the physical properties of an EPDM or EPM matrix into which a ppEPDM-based TPV (samples M01-1, M02-1, and M05-1) or a silicone-based TPV that consists of fully cured silicone rubber particles dispersed in a continuous thermoplastic silicone rubber phase (samples M06-1, M07-1, and M10-1) was investigated. The results are summarized in Table 6.

TABLE 6

| | | Sample No. | | | | | |
|---|---|---|---|---|---|---|---|
| | | M01-1 | M02-1 | M05-1 | M06-1 | M07-1 | M10-1 |
| Component | | | | | | | |
| EPDM | ROYALENE 525 | 100 g | | | 100 g | | |
| | VISTALON 404 | | 100 g | | | 100 g | |
| | KEPA 1130 | | | 100 g | | | 100 g |
| | ppEPDM | 100 g | 100 g | 100 g | | | |
| | TPSiV - PDMS-TPV | | | | 100 g | 100 g | 100 g |
| | TMPTMA 70 | 4.66 g | 4.66 g | 4.66 g | 4.66 g | 4.66 g | 4.66 g |
| | crosslinking agent (TRIGONOX 17-40B) | 7 g | 7 g | 7 g | 7 g | 7 g | 7 g |
| Property | | | | | | | |
| | Shore Hardness A vulc. at 165° C. | 68.1 | 66.4 | 77.3 | 62.6 | 51.9 | 70.0 |
| | Tensile Strength MPa LONG. | 10.41 | 3.18 | 4.28 | 7.23 | 3.77 | 6.97 |
| | Elongation at break (%) | 238.0 | 38.7 | 23.7 | 280.0 | 424.0 | 198.3 |

Figure 6:
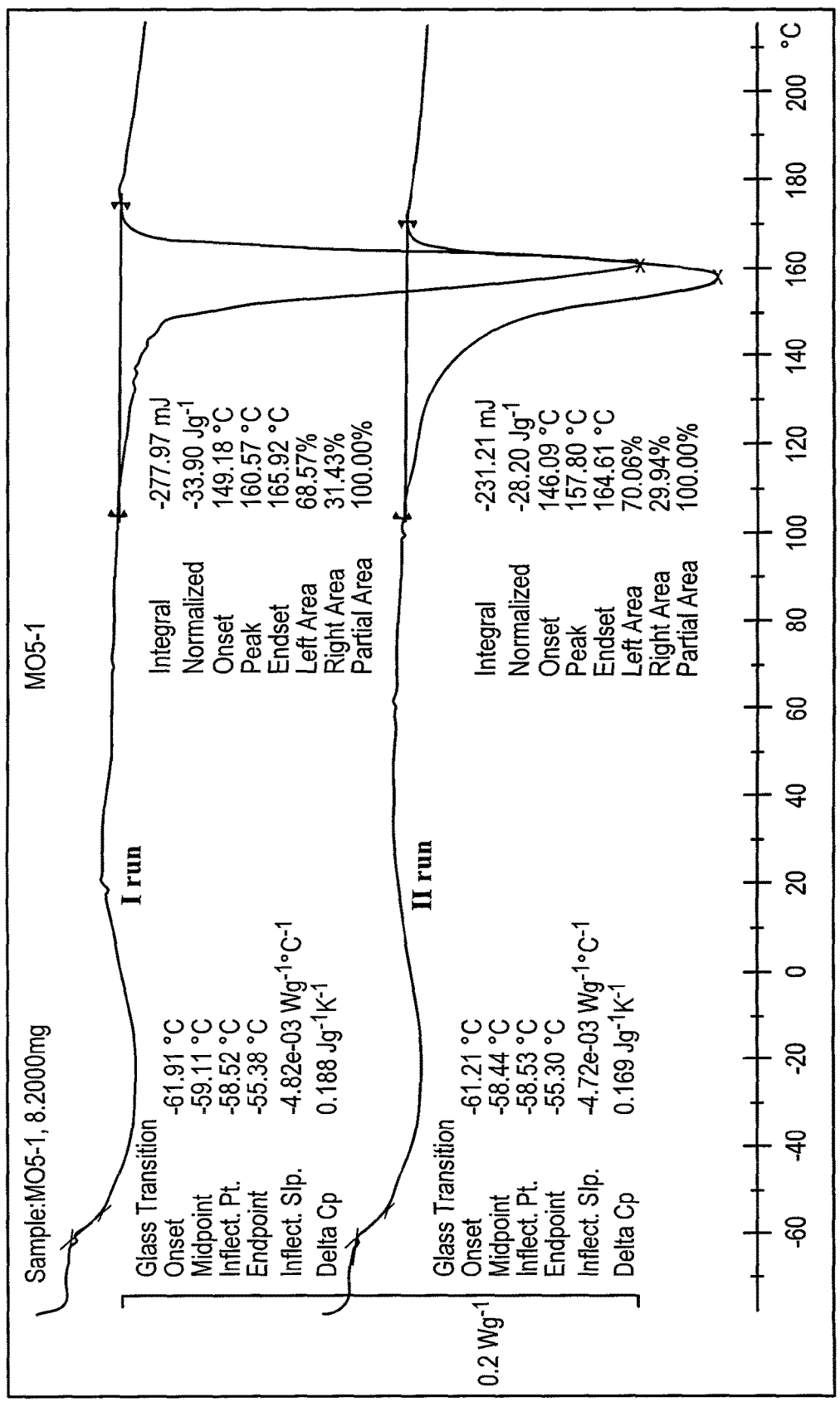
FIG. 6 presents results of a DSC analysis of an embodiment of the precursor herein disclosed.
Figure 7A:
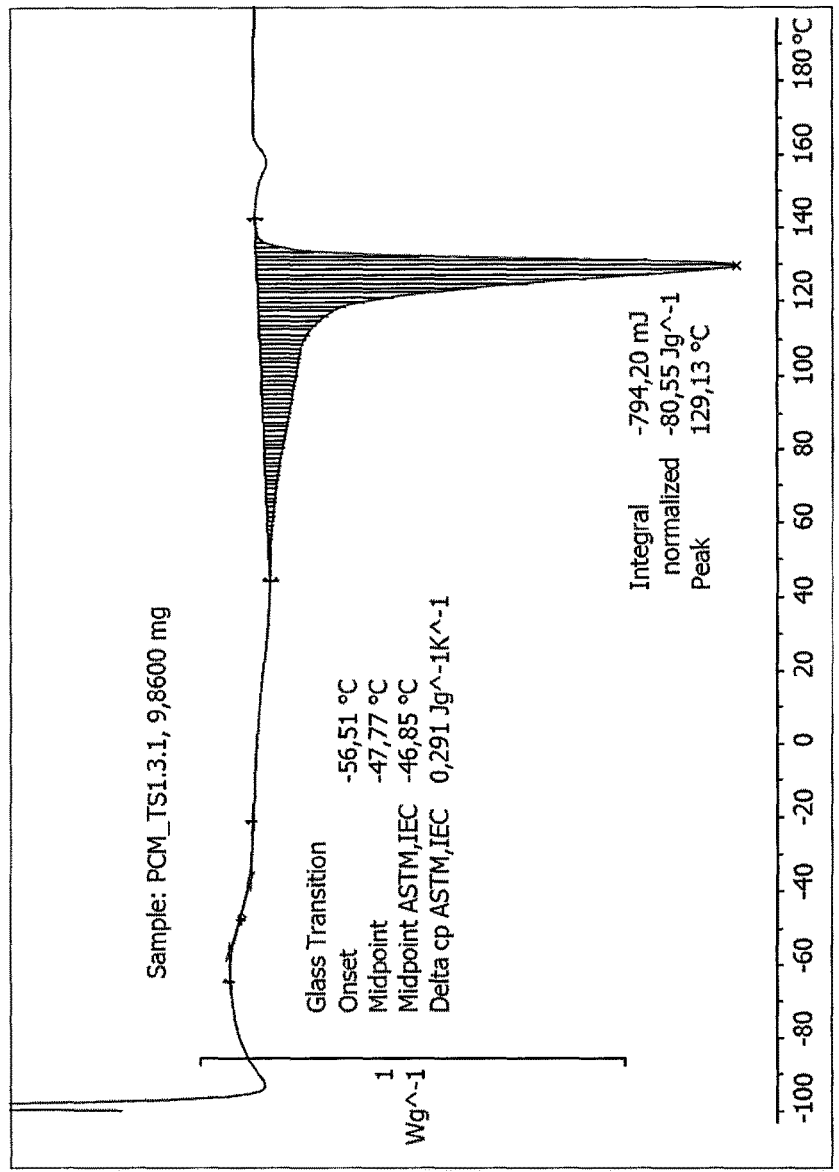
FIG. 7 presents results of DSC analyses of a number of natural expanded graphite-containing compositions for use as thermal energy storage materials; and, FIG. 8 presents the results of a TGA analysis of a typical rubber composition known in the art that contains a silica filler.
Figure 7B:
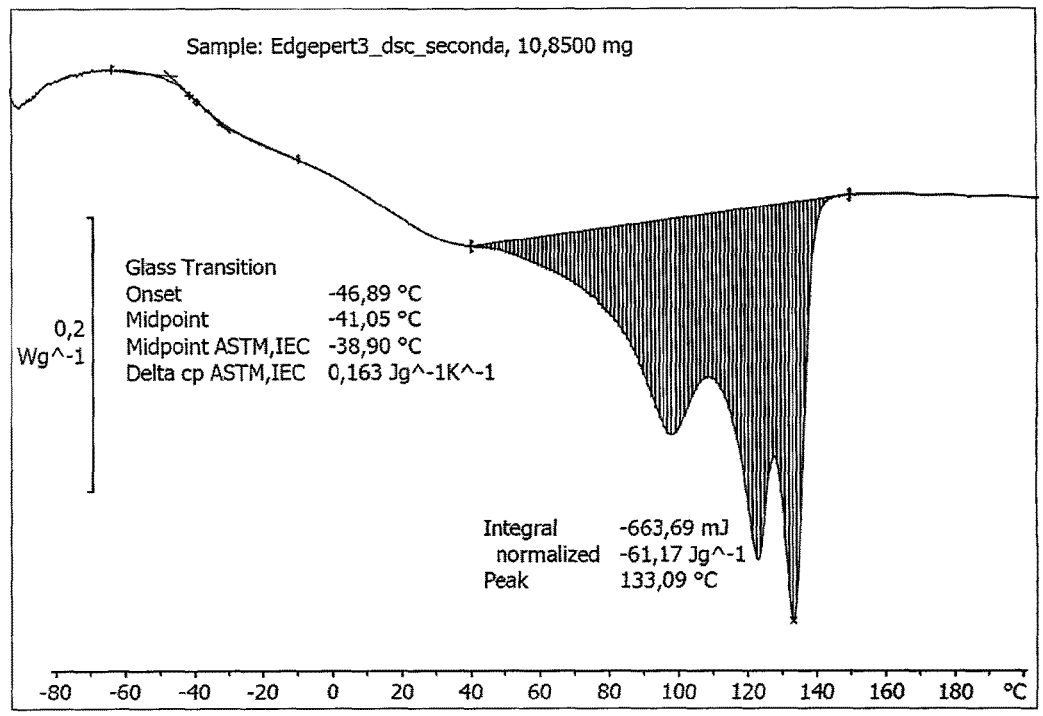
Figure 7C:
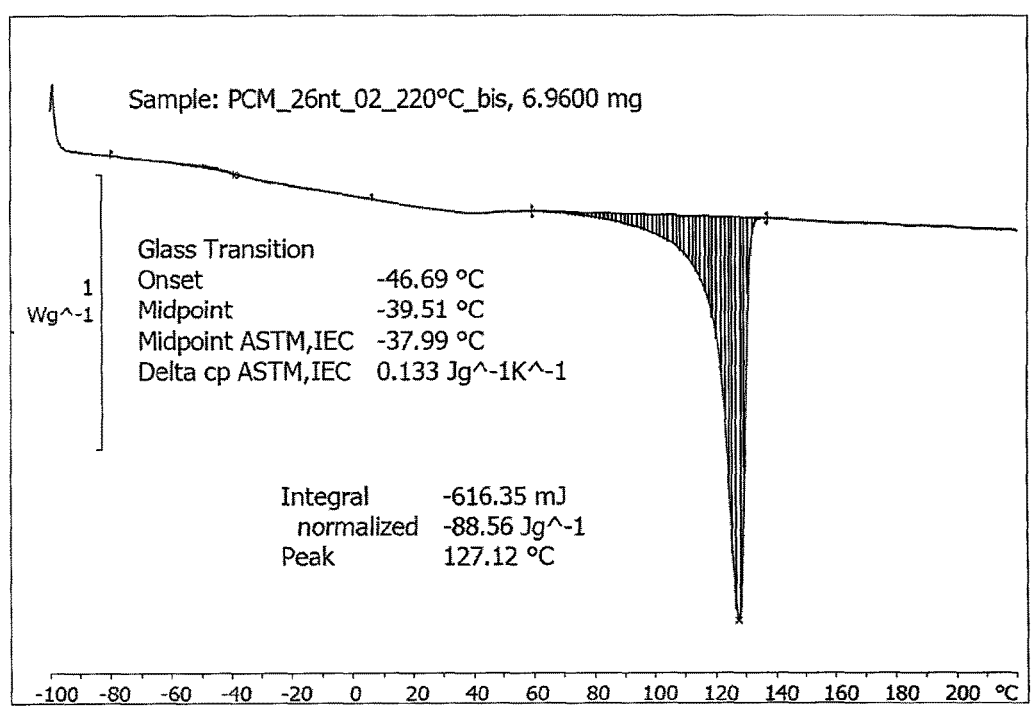
Figure 7D:
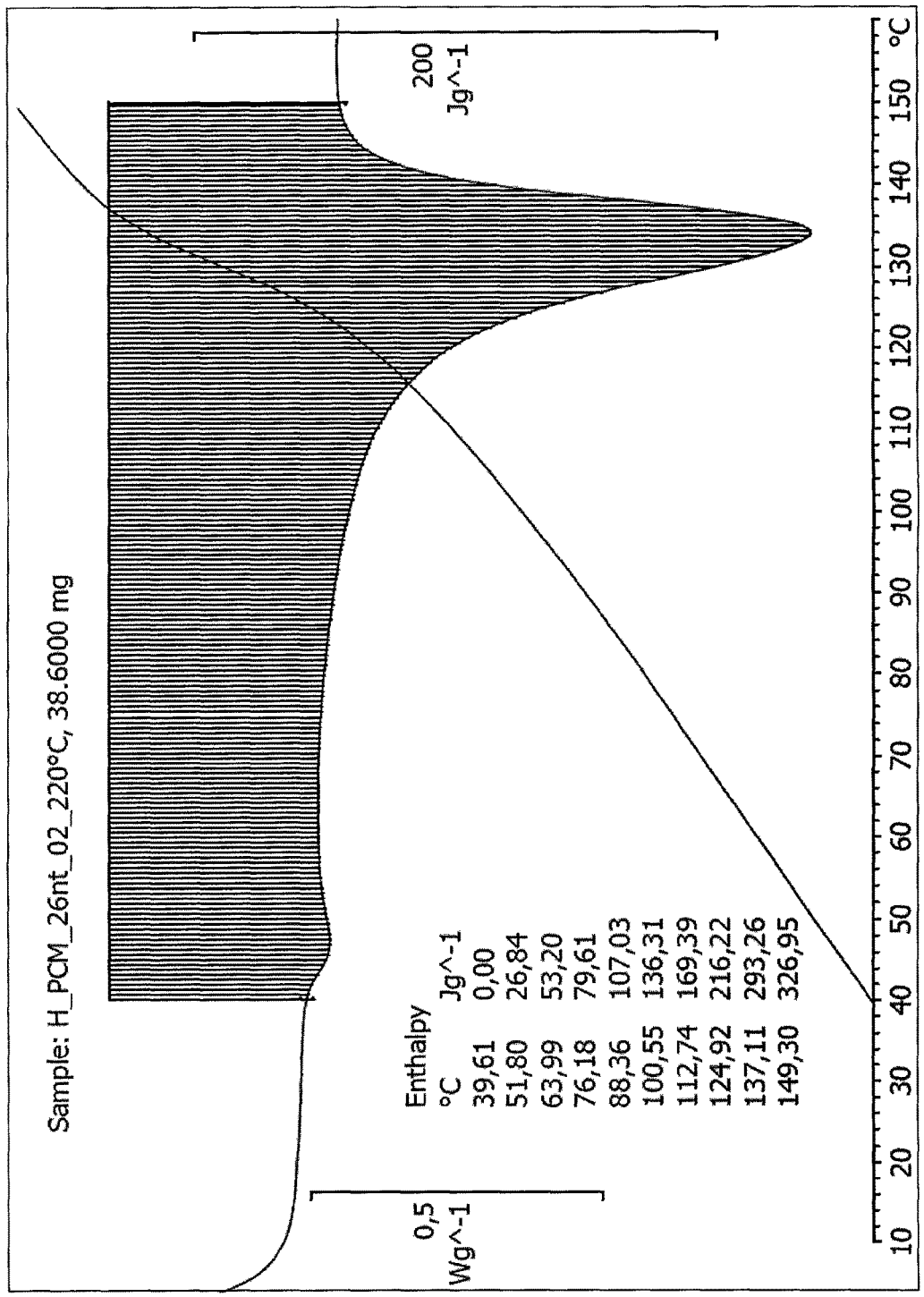

Reference is now made to FIG. 6, which presents DSC traces for composition M05-1. DSC measurements were made for the other compositions listed in Table 5 and do not show any qualitative differences.

The results summarized in the table and illustrated in the accompanying DSC trace demonstrate that it is possible to produce composites of these materials, and that these composites have useful physical properties as well.

Example 11

A number of embodiments of the invention herein disclosed are suitable for use as PCMs. Typical compositions of these embodiments are presented in Tables 7 and 8.

TABLE 7

| Component | | PCM 2-1 | PCM 2-6 | PCM 2-7 | PCM 2-10 |
|---|---|---|---|---|---|
| EPDM | ROYALENE 525 | | | 100 | 100 |
| | KEPA 1130 | 100 | 100 | | |
| | High-density polyethylene | 100 | 200 | 100 | 200 |
| | carbon black | 55 | 55 | 55 | 55 |
| | polyethylene AC6 | 2 | 2 | 2 | 2 |
| | ZnO | 1 | 1 | 1 | 1 |
| | MgO | 2 | 2 | 2 | 2 |
| | TMPTMA 70% | 4.66 | 4.66 | 4.66 | 4.66 |
| | crosslinking agent (TRIGONOX 17-40) | 7 | 7 | 7 | 7 |

TABLE 8

| Component | PCM 1-2 | PCM 1-3 | PCM 1-4 | PCM 1-7 | PCM 1-8 | PCM 1-9 | PCM 1-10 |
|---|---|---|---|---|---|---|---|
| polyacrylate (ACM) | 100 | 100 | 100 | 100 | 100 | 100 | 100 |
| Zeon - Zeotherm ® TPV (ACM) | 100 | | 100 | 50 | 200 | 100 | 200 |
| nylon 6 polyamide | | 100 | 100 | 50 | 100 | 200 | 200 |
| CB N550 | 55 | 55 | 55 | 55 | 55 | 55 | 55 |
| antioxidant (NAUGARD 445) | 2 | 2 | 2 | 2 | 2 | 2 | 2 |
| Stearic Acid | 0.5 | 0.5 | 0.5 | 0.5 | 0.5 | 0.5 | 0.5 |
| Polyoxyethylene octadecyl ether phosphate lubricant (Vanfre VAM) | 1 | 1 | 1 | 1 | 1 | 1 | 1 |
| Distilled octadecyl amine (ARMEEN 18D) | 0.5 | 0.5 | 0.5 | 0.5 | 0.5 | 0.5 | 0.5 |
| VULCOFAC ACT 55 | 2 | 2 | 2 | 2 | 2 | 2 | 2 |
| 1-(6-Aminohexyl)-carbamic acid | 1.2 | 1.2 | 1.2 | 1.2 | 1.2 | 1.2 | 1.2 |
| polyethylene AC6 | 0.6 | 0.6 | 0.6 | 0.6 | 0.6 | 0.6 | 0.6 |
| plasticizer (RHENOSIN W 759) | 10 | 10 | 10 | 10 | 10 | 10 | 10 |

Example 12

Further compositions suitable for use as PCMs were prepared. Typical compositions of these embodiments are given in Tables 9, 10 and 11.

TABLE 9

| | Sample No. | | |
|---|---|---|---|
| Component | PCM-26-1 | PCM-26-2 | PCM-26-3 |
| SBR | 100.29 g | 100.29 g | 100.29 g |
| tire scrap dust 0-0.5 | 55.71 g | 55.71 g | 55.71 g |
| EUROPRENE SOL TH2315 | 29.71 g | 29.71 g | 29.71 g |
| HDPE ERACLENE PF92 | 100.28 g | 100.28 g | 100.28 g |
| Carbon black N550 | 60.00 g | 0.00 g | 30.00 g |
| Natural expanded graphite | 0.00 g | 60.00 g | 30.00 g |
| Stearic Acid | 2.00 g | 2.00 g | 2.00 g |
| Struktol MS 40 Flakes | 7.00 g | 7.00 g | 7.00 g |
| ZnO | 3.00 g | 3.00 g | 3.00 g |
| Antioxidant 2246 | 2.00 g | 2.00 g | 2.00 g |
| MBT | 0.20 g | 0.20 g | 0.20 g |
| CBS RH80 | 1.50 g | 1.50 g | 1.50 g |
| S80 | 2.25 g | 2.25 g | 2.25 g |
| Property | | | |
| Shore Hardness A vulc. at 160° C. | 89.9 | 88.3 | 89.1 |
| Tensile Strength MPa LONG. | 9.57 | 7.45 | 8.78 |
| Elongation at break (%) | 161.0 | 206.0 | 181.3 |
| Density | 1.02 | 1.02 | 1.01 |

TABLE 10

| | Sample No. | | |
|---|---|---|---|
| Component | PCM-25A-1 | PCM-25A-2 | PCM-25A-3 |
| HY TEMP AR212XP (POLYACRYLATE ACM ELAST) | 100.00 g | 100.00 g | 100.0 g |
| ZEOTHERM 100-60B ACM-TPV | 66.70 g | 66.70 g | 66.70 g |
| ESTAMID 6E NAT (PA6) | 133.30 g | 133.30 g | 133.30 g |
| Carbon black N550 | 60.00 g | 0.00 g | 30.00 g |
| Natural expanded graphite | 0.00 g | 60.00 g | 30.00 g |
| Stearic Acid | 1.75 g | 1.75 g | 1.75 g |
| OFALUB SEO | 1.00 g | 1.00 g | 1.00 g |
| ARMEEN 18D | 0.50 g | 0.50 g | 0.50 g |
| antioxidant LUWOMAX CDPA | 2.00 g | 2.00 g | 2.00 g |
| INTERCURE No1 | 1.20 g | 1.20 g | 1.20 g |
| Polietil AC 6 | 0.60 g | 0.60 g | 0.60 g |
| LINCOL 9 | 10.0 g | 10.0 g | 10.0 g |
| ALCANPOUDRE DBU 70 | 3.00 g | 3.00 g | 3.00 g |
| Property | | | |
| Shore Hardness A vulc. at 160° C. | 88.4 | 85.1 | 88.3 |
| Tensile Strength MPa LONG. | 4.73 | 3.70 | 6.03 |
| Elongation at break (%) | 7.8 | 8.0 | 8.0 |
| Density | 1.19 | 1.12 | 1.18 |

TABLE 11

| | Sample No. | | |
|---|---|---|---|
| Component | PCM-NT-02-220 | TS-1.3.1 | EDGEPERT3 |
| EPDM - Nordel 4725 | 100.00 g | 100.00 g | 0.00 g |
| tire scrap dust 0-0.5 | 44.50 g | 0.00 g | 0.00 g |

TABLE 11-continued

| | Sample No. | | |
|---|---|---|---|
| | PCM-NT-02-220 | TS-1.3.1 | EDGEPERT3 |
| EPDM - Royaledgde 5040 | 0.00 g | 0.00 g | 100.00 g |
| SEBS | 22.20 g | 0.00 g | 0.00 g |
| HDPE | 111.30 g | 200.00 g | 50.00 g |
| µ-particles HDPE | 0.00 g | 0.00 g | 50.00 g |
| PP-EPDM | 0.00 g | 100.00 g | 0.00 g |
| EPDM - Royalene 525 | 0.00 g | 70.00 g | 0.00 g |
| ENGAGE | 0.00 g | 0.00 g | 10.00 g |
| EVA - ESCORENE | 0.00 g | 0.00 g | 50.00 g |
| HI WAX 110P | 0.00 g | 102.00 g | 50.00 g |
| Graphite | 0.00 g | 0.00 g | 7.00 g |
| Natural expanded graphite | 0.00 g | 51.00 g | 21.00 g |
| Stearic Acid | 1.00 g | 1.70 g | 1.00 g |
| Printex X2 | 0.00 g | 0.00 g | 28.00 g |
| ZnO | 5.00 g | 8.50 g | 5.00 g |
| TMTD RH70 | 3.00 g | 5.10 g | 3.00 g |
| ZDBC RH80 | 4.00 g | 6.80 g | 4.00 g |
| S80 | 3.00 g | 5.10 g | 3.00 g |
| Property | | | |
| Shore Hardness A vulc. at 160° C. | | 82.7 | 97.0 |
| Tensile Strength MPa LONG. | 10.69 | 5.93 | 0.87 |
| Elongation at break (%) | 499.0 | 350.0 | 104.0 |
| Enthalpy 40-150° C. J/g | 327.00 | 320.00 | 322.00 |

Reference is now made to FIGS. 7A-7D, which presents DSC traces for the various compositions. No evidence for melting of the composite material of matrix 10 is found. Thermoplastic PCM 20, however does undergo a phase change and melting does occur. Heat absorption and release are detected when the thermoplastic PCM 20 is heated or cooled and phase changes occur. These results demonstrate that incorporation of thermoplastic microparticles produces a thermoplastic phase for the thermoplastic PCM 20 even when the broader matrix material 10 does not undergo a phase change, such that thermal release is evidenced upon the phase change of the Thermoplastic PCM even though the shape and structure of the matrix is retained. The composite material of matrix 10 is therefore suitable for use as a thermal energy storage material.

Example 13

Figure 8:
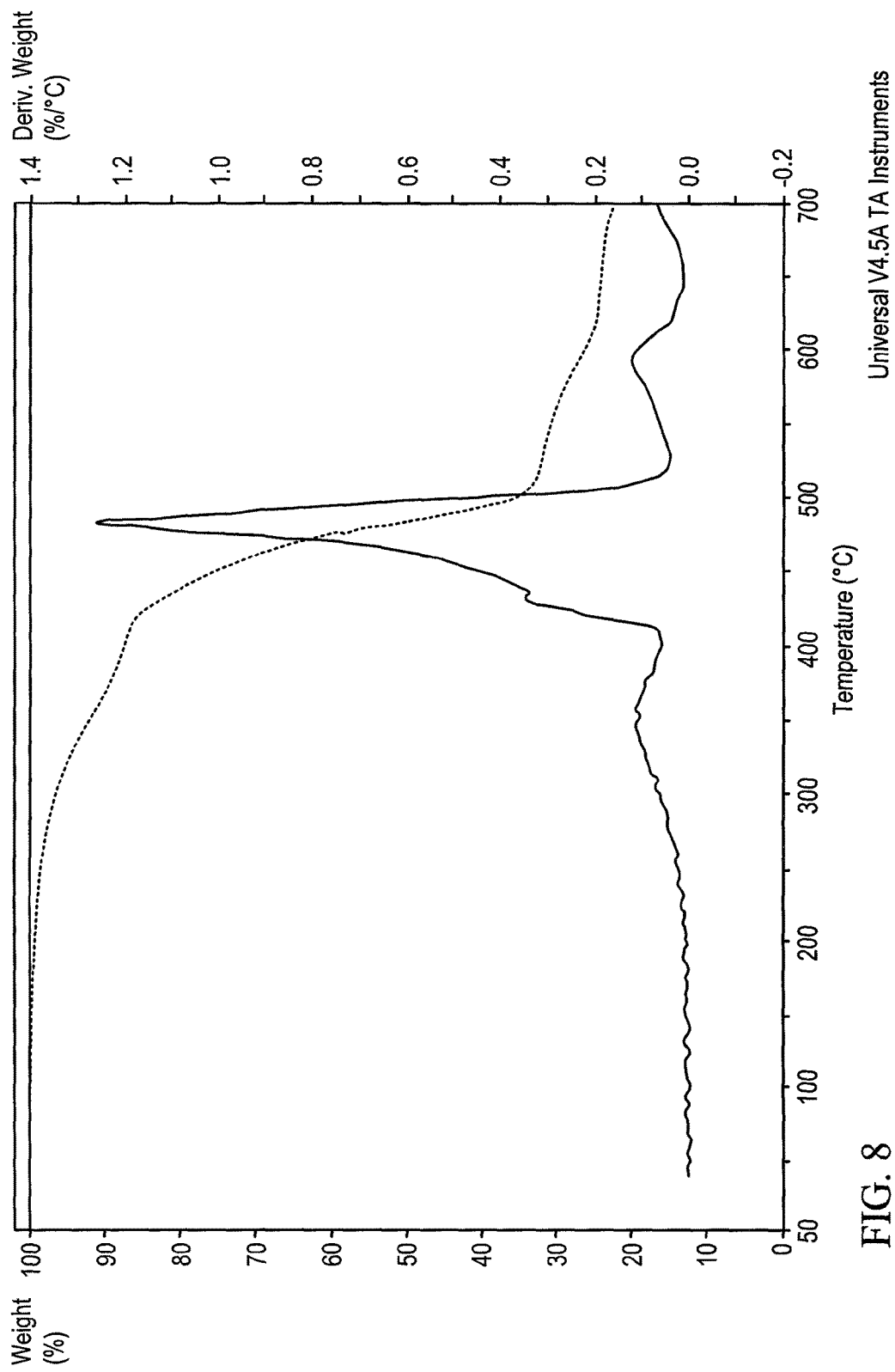

For purposes of comparison, a rubber composition lacking TPV, similar to those known in the art, was prepared. The composition consisted of 100 parts EPDM, 30 parts plasticizer, 12 parts carbon black, 32 parts silica, 6 parts silane, 6 parts ZnO, 1 part stearic acid, 10 parts peroxide cross-linking agent, and 1.5 parts TAC. Reference is now made to FIG. 8, which presents the results of a TGA analysis of this composition. The TGA was performed under the same conditions as were used in the TGA analysis shown in FIG. 3. As can be seen in the figure, more than 20% of the initial weight remains after the conclusion of the TGA run, in contrast to the compositions of the present invention, in which essentially none of the material initially present remains. Also, unlike the compositions of the present invention, there is no single sharp derivative peak corresponding to oxidation of the carbon black contained within the composition.

What is claimed is:

1. A composite material for storing thermal energy, wherein said composite material comprises a matrix comprising an elastomeric material, said elastomeric material made from a precursor comprising:
   a rubber;
   a material incorporated into said rubber, said material comprises a thermoplastic vulcanizate (TPV), microparticles of TPV, thermoplastic incorporating microparticles of rubber, thermoplastic incorporating microparticles of cured thermoplastic, thermoplastic incorporating microparticles of uncured thermoplastic, or any combination thereof, and, at least one cross-linking agent;
   wherein said thermoplastic vulcanizate (TPV), microparticles of TPV, thermoplastic incorporating microparticles of rubber or combination thereof is between 50.1% and 200% by weight relative to said rubber.

2. The composite material for storing thermal energy according to claim 1, further comprising at least one type of encapsulated microparticulate phase change material (PCM) dispersed within said elastomeric material.

3. The composite material for storing thermal energy according to claim 1, wherein said matrix comprises a rubber-TPV/thermoplastic composite into which rubber microparticles, or rubber-ceramic microparticles have been incorporated or said matrix comprises a rubber-thermoplastic composite into which rubber microparticles, rubber-ceramic microparticles, microparticles of cured thermoplastic-ceramic, microparticles of cured thermoplastic have been incorporated.

4. The composite material for storing thermal energy according to claim 1, wherein said matrix has a three-dimensional structure that allows free passage of gases and/or liquids.

5. The composite material for storing thermal energy according to claim 2, wherein said microparticulate PCM comprises an inorganic salt or an organic compound.

6. The composite material for storing thermal energy according to claim 2, wherein said microparticulate PCM comprises microparticles encapsulated in microcapsules.

7. The composite material for storing thermal energy according to claim 6, wherein an external surface of said microcapsules is functionalized or said microcapsules comprise a void space.

8. The composite material for storing thermal energy according to claim 7, wherein said external surface is silane functionalized.

9. The composite material for storing thermal energy according to claim 1, wherein said microparticles of rubber comprise microparticles of recycled rubber.

10. The composite material for storing thermal energy according to claim 1, wherein said rubber is selected from the group consisting of natural rubber (NR), nitrile butadiene rubber (NBR), hydrogenated nitrile butadiene rubber (HNBR), carboxylated nitrile rubber (XNBR), butyl rubber (IIR), chlorobutyl rubber (CIIR), bromobutyl rubber (BIIR), polychloroprene (CR), styrene-butadiene rubber (SBR), polybutadiene (BR), ethylene-propylene-diene tripolymer (EPDM), ethylene-propylene rubber (EPM), polyurethane rubber (PU), acrylic rubber (ACM), ethylene vinylacetate copolymer rubber (EVM), silicone rubber, and any combination of the above.

11. The composite material for storing thermal energy according to claim 1, wherein said TPV is selected from the group consisting of TPVs and TPV precursors of the following types of rubber: polypropylene/EPDM (ppEPDM), thermoplastc-silicone mixtures, styrene-based thermoplastic vulcanizates, poly(styrene-butadiene-styrene) (SBS), styrene isoprene butadiene (SIBS), acrylonitrile butadiene styrene (ABS), and styrene ethylene butylene styrene copolymer (SEBS), polyethylene/EPDM (peEPDM), polyethylene/EPM (peEPM), polyurethane (PU), polyamide/acrylic rubber (paACM), polyoxymethylene/nitrile rubber (pomNBR), and thermoplastic polyester elastomer/ethylene vinylacetate copolymer rubber (tpc-etEVM), and any combination thereof.

12. The composite material for storing thermal energy according to claim 1, wherein said cross-linking agent is selected from the group consisting of sulfur, peroxides, phenolic resins, amines, and acrylates.

13. The composite material for storing thermal energy according to claim 1, wherein said precursor additionally comprises at least one material selected from the group consisting of carbon black, graphite, graphene, natural expanded graphite, aluminum nitride, and boron nitride.

14. The composite material for storing thermal energy according to claim 2, wherein said phase change material (PCM) has a working temperature of between 30° C. and 450° C.

15. A method for making a composite material for thermal energy storage, wherein said method comprises:
preparing a matrix comprising an elastomeric material, said preparing comprising:
mixing rubber and at least one material selected from the group consisting of TPV, thermoplastic incorporating microparticles of rubber and any combination thereof; and,
adding at least one cross-linking agent; and,
dispersing microparticles of a phase change material (PCM) within said matrix.

16. The method according to claim 15, additionally comprising:
forming pellets from microparticles;
coating said microparticles with a polyimide polymer, thereby forming polyimide-coated microparticles;
obtaining a silicon dioxide sol-gel precursor;
mixing said silicon dioxide sol-gel precursor with 3-aminopropytriethoxysilane, thereby forming a silicate precursor;
placing said polyimide-coated microparticles in said silicate precursor;
heating said silicate precursor;
adding ethanol and hydrochloric acid to said silicate precursor;
hydrolyzing said silicate precursor;
neutralizing said silicate precursor; and,
encapsulating said polyimide-coated microparticles with said sol-gel silicon dioxide precursor.

17. The method according to claim 16, wherein said step of forming pellets from microparticles comprises forming pellets from a microparticulate PCM.

18. The method according to claim 17, wherein said step of forming pellets from microparticles comprises forming pellets from a microparticulate PCM comprising at least one inorganic salt or at least one organic compound.

19. A method for storing thermal energy, releasing thermal energy or combination thereof, the method comprises:
supplying thermal energy from a thermal environment to the composite material of claim 1 and thereby, performing a phase transition of said TPV, microparticles of TPV and/or thermoplastic of said thermoplastic incorporating microparticles of rubber, thermoplastic incorporating microparticles of cured thermoplastic and/or thermoplastic incorporating microparticles of uncured thermoplastic from solid to a molten state and storing the thermal energy; or
absorbing thermal energy via a cold environment from the composite of claim 1 and thereby, releasing the stored thermal energy from the molten TPV, microparticles of TPV and/or thermoplastic of said thermoplastic incorporating microparticles of rubber, thermoplastic incorporating microparticles of cured thermoplastic and/or thermoplastic incorporating microparticles of uncured thermoplastic; and performing a phase transition from a molten to solid state.

20. A system for storing and/or releasing thermal energy comprising a heat exchange unit, a conductive rubber matrix and a composite material of claim 1, wherein the heat exchange unit is in thermal contact with said composite material.

21. The system of claim 20, wherein said system is a battery cell.

* * * * *